US007956572B2

(12) United States Patent
Zane et al.

(10) Patent No.: US 7,956,572 B2

(45) Date of Patent: Jun. 7, 2011

(54) SYSTEMS AND METHODS FOR RECEIVING AND MANAGING POWER IN WIRELESS DEVICES

(75) Inventors: Regan Zane, Superior, CO (US); Zoya Popovic, Boulder, CO (US); Andrew Sharp, Makanda, IL (US); Diego Restrepo, Littleton, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 555 days.

(21) Appl. No.: 12/091,025

(22) PCT Filed: Oct. 23, 2006

(86) PCT No.: PCT/US2006/041355

§ 371 (c)(1), (2), (4) Date: Aug. 11, 2008

(87) PCT Pub. No.: WO2007/048052

PCT Pub. Date: Apr. 26, 2007

(65) Prior Publication Data

US 2009/0200985 A1 Aug. 13, 2009

Related U.S. Application Data

(60) Provisional application No. 60/760,040, filed on Jan. 17, 2006, provisional application No. 60/729,378, filed on Oct. 21, 2005.

(51) Int. Cl.
*H02J 7/00* (2006.01)
*H01Q 9/00* (2006.01)

(52) U.S. Cl. ........................................ 320/108; 343/751

(58) Field of Classification Search .................. 320/108
See application file for complete search history.

(56) References Cited

U.S. PATENT DOCUMENTS

| | | | | |
|---|---|---|---|---|
| 5,068,669 | A | 11/1991 | Koert | |
| 5,719,586 | A | 2/1998 | Tuttle | |
| 7,545,759 | B2 * | 6/2009 | Hayashi | 370/295 |
| 2002/0047615 | A1 * | 4/2002 | Yokozeki et al. | 315/248 |
| 2006/0061323 | A1 * | 3/2006 | Cheng et al. | 320/108 |

OTHER PUBLICATIONS

SG200802989-4—Written Opinion.
SG200802989-4—Search Report.
200680047643.5—Office Action.
European Search Report dated Feb. 17, 2011 in corresponding European Application No. 06 826 504.0-2220.
Australian Office Action dated Feb. 7, 2011 in corresponding Australian Application No. 2006304861.

* cited by examiner

*Primary Examiner* — M'Baye Diao
(74) *Attorney, Agent, or Firm* — Snell & Wilmer LLP

(57) ABSTRACT

Exemplary systems and methods are provided for collecting/harvesting direct current (DC) power received from a power source(s). The system comprises a controlled impedance power controller comprises a power converter configured to present a positive equivalent resistive load to the at least one power source over a range of input power levels. Exemplary systems and methods are provided for collecting radio frequency (RF) power. An exemplary system comprises at least two rectenna elements, a power controller, and a DC combining circuit. The DC combining circuit is associated with the at least two rectenna elements and the DC combining circuit is configured to dynamically combine the at least two rectenna elements in one of a plurality of series/parallel configurations. The power controller is configured to control the DC combining circuit to achieve a desired overall power output from the at least two rectenna elements.

26 Claims, 16 Drawing Sheets

(a)

(b)

(a)

(b)

Fig. 19: Schematic of discrete transistor-diode boost converter. Control circuitry consists of a LF oscillator that directly powers the HF oscillator. The HF oscillator output drives the N-Channel MOSFET $Q_1$.

SYSTEMS AND METHODS FOR RECEIVING AND MANAGING POWER IN WIRELESS DEVICES

CROSS-REFERENCE TO RELATED APPLICATIONS

This application claims priority to U.S. Provisional Patent Application Ser. No. 60/729,378 filed Oct. 21, 2005, U.S. Provisional Patent Application Ser. No. 60/760,040, filed Jan. 17, 2006, and PCT Application Number PCT/US2006/041355, filed Oct. 23, 2006, all incorporated herein by reference.

FIELD OF INVENTION

This application relates generally to systems and methods for receiving and managing power in wireless devices, and more particularly, to systems and methods for harvesting and/or collecting RF power and/or for converting direct current power.

BACKGROUND OF THE INVENTION

Sensors and transmitters that are small and require low levels of power for operation are frequently used for collecting information without being intrusive to their operating environment. For example, a battery powered sensing and transmitting device may be surgically implanted within living tissue to sense and transmit characteristics of the body in which it is implanted.

The lifetime of the battery used within such a sensor often requires additional surgical procedures to periodically replace the battery. Similarly, where a sensor and transmitting device is located within controlled or hazardous environments, it is often a time-consuming and expensive task to periodically replace the battery.

Energy may be collected/harvested from radio frequency ("RF") waves for use in remote sensors and transmitting devices. One example of this functionality is an RF identification ("RFID") tag that derives power from an RF wave (e.g., from a transmitting device operating to read the RFID tag) and uses that power to transmit an identification signal. One drawback of this technology is that the RFID tags typically only operate over short distances.

A rectenna is an antenna that includes a rectifier; the rectenna receives RF waves, rectifies the waves and produces direct current ("DC") power. The DC power produced by the rectenna is dependent on rectenna design, RF wave frequency, RF wave polarization and RF wave power level incident at the rectenna. Typically, the DC power output from the rectenna is conditioned by conditioning electronics before being fed to a powered device (e.g., sensor, microprocessor, transmitter etc.). Where characteristics of the RF wave vary, the DC power output from the rectenna also varies; this affects power conversion efficiency due to loading upon the rectenna by the conditioning electronics which attempts to maintain a constant power output for the powered device.

SUMMARY OF THE INVENTION

In one embodiment, a radio frequency (RF) reception device has a first periodic or aperiodic antenna array with one or more antenna elements. Electrical conductors provide connectivity of the antenna elements such that selective reception of radio frequency energy by the first periodic or aperiodic antenna array is determined by size and layout of each of the antenna elements, the connectivity, and coupling to one or more rectifiers.

In another embodiment, a reconfigurable radio frequency (RF) reception device has a plurality of antenna elements, each of the antenna elements having at least one rectifier, wherein a first set of antenna elements, selected from the plurality of antenna elements, has a first size and wherein a second set of antenna elements, selected from the plurality of antenna elements, has a second size. Electrical conductors provide connectivity to each of the plurality of antenna elements and rectifiers such that selective reception of RF energy by the plurality of antenna elements is determined by size, shape, layout and substrate characteristics of the plurality of antenna elements, the connectivity, and coupling of one or more rectifiers to the plurality of antenna elements.

In another embodiment, a system for selective radio frequency (RF) reception has a periodic or aperiodic antenna array with a plurality of first antenna elements. Electrical conductors provide connectivity to each of the first and second sets of antenna elements such that selective polarized reception of RF energy by the aperiodic antenna array is determined by orientation and feed points of the antenna elements, the connectivity, and coupling of one or more rectifiers to each antenna element.

In another embodiment, a system collects and conditions variable DC electrical power from at least one source. The system includes conditioning electronics for converting the variable DC electrical power to storable DC power, the conditioning electronics presenting a positive impedance to the at least one source, and a storage device for storing the storable DC power.

In another embodiment, a system collects/harvests energy from radio frequency (RF)/microwave/millimeter-wave power. The system includes a receiving device with at least one antenna and at least one rectifier, the receiving device converting the RF/microwave/millimeter-wave power into direct current (DC) electricity. The system also has a power management unit that (a) configures the receiving device based upon the DC power, (b) presents a desired load to the receiving device and (c) stores the DC power.

In another embodiment, a method converts radio frequency (RF) energy into usable direct current (DC) power, including the steps of: receiving the RF energy using at least one rectenna, loading the at least one rectenna with a desired impedance, transferring the received power to a storage device, and conditioning the stored power to provide the DC power.

In another embodiment, a method converts variable low power DC power into usable direct current (DC) power, including the steps of: sensing characteristics of the variable low power DC power; selecting, based upon the sensed characteristics, a DC-to-DC converter module and operating characteristics to convert the variable low power DC power to power suitable for storage; storing the converted power in a suitable storage device; and conditioning the stored power to produce usable DC power.

In another embodiment, a software product has instructions, stored on computer-readable media, wherein the instructions, when executed by a computer, perform steps for designing a system for collecting/harvesting energy from RF waves, including steps of: interacting with rectenna design software to select desired rectenna configuration for overall combined rectenna and power manager efficiency; solving appropriate converter topology; selecting converter components and operating conditions for maximum efficiency based upon selected rectenna configuration and output characteristics over designated incident power characteristics; and selecting appropriate control approach and settings for maximum overall system efficiency over given system characteristics.

In another embodiment, a method of designing a rectenna includes the steps of: selecting element size of the rectenna based upon available area, incident radiation power levels and operating frequency range; selecting element polarization based upon the RF environment of operation; selecting rectenna material based upon propagation medium and frequency range; selecting rectenna array shape and size based upon required output power levels, available power storage, operational duty cycles and available space; selecting a number of elements connected to each rectifier based upon incident power levels and selected element size; and selecting a radome appropriate for intended use.

In another embodiment, a software product has instructions, stored on computer-readable media, wherein the instructions, when executed by a computer, perform steps for designing a rectenna, including instructions for: interactively using power management design software to select optimum rectenna configuration for overall combined rectenna and power management efficiency; optimizing rectifier circuitry based upon application; solving rectifier circuit topology based upon optimized rectifier circuitry; solving antenna topology based upon optimized rectifier circuitry, polarization, incident radiation power level and frequency using full-wave electromagnetic simulations; solving DC network at RF frequencies using a combination of full-wave electromagnetic and high-frequency circuit simulations; selecting appropriate combined antenna and rectifier topology; selecting appropriate DC network topology and operating characteristics; selecting appropriate array configuration; and selecting appropriate package for integration with power manager based upon simulation of package for RF compatibility.

In another embodiment, a software product has instructions, stored on computer-readable media, wherein the instructions, when executed by a computer, perform steps for designing a system for collecting/harvesting energy from power sources, including instructions for: interacting with power source design software to select one or more desired power sources for overall combined power source and power manager efficiency; solving appropriate converter topology; selecting converter components and operating conditions for maximum efficiency based upon selected power source configuration and output characteristics over designated incident power characteristics; and selecting appropriate control approach and settings for maximum overall system efficiency over given system characteristics.

In another embodiment, a software product has instructions, stored on computer-readable media, wherein the instructions, when executed by a computer, perform steps for designing a power source, including instructions for: interactively interacting with power management design software to select optimum power source configuration for overall combined power source and power management efficiency; optimizing power source circuitry based upon application; selecting appropriate DC network topology and operating characteristics; and selecting appropriate package for integration with power manager based upon simulation of package for power source compatibility.

In another embodiment, a system collects and conditions variable DC electrical power from at least one source. Conditioning electronics converts the variable DC power to storable DC power and presents a positive equivalent resistive load to the at least one source. A storage device stores the storable DC power. The positive equivalent resistive load corresponds to optimal load resistance of the source over a range of input power levels.

In another embodiment, an integrated converter collects and conditions variable DC electrical power from at least one source. Conditioning electronics converts the variable DC electrical power to storable DC power and presents a positive equivalent resistive load to the at least one source. A controller controls the topology and switching frequency of the conditioning electronics. A storage device stores the storable DC power. The controller adaptively adjusts one or more of the switching frequency and topology to extract power from the rectenna while storing the collected/harvested energy.

In accordance with an exemplary embodiment, a system for collecting radio frequency ("RF") power, comprises a power source, a DC combining circuit, a controlled impedance power controller, and an energy storage device. The power source comprises at least a first antenna element and a second antenna element, wherein each of the first and second antenna elements are coupled to at least one rectifier to form at least two rectenna elements, where the power source converts the RF power into a direct current ("DC") power source output power. The DC combining circuit is associated with the power source, and the DC combining circuit is configured to dynamically combine the at least two rectenna elements in one of a plurality of series/parallel configurations. The controlled impedance power controller may comprise: a power converter having a power converter input and configured to receive the DC power source output power at the power converter input, wherein the DC power source output power comprises current and voltage characteristics which may drift over time, wherein the power converter is configured to present a positive equivalent resistive load to the power source over a range of input power levels; and wherein the controlled impedance power controller is further configured to control the DC combining circuit such that the DC power source output power approaches a desired overall power output from the at least two rectenna elements. The energy storage device is configured to store the DC power source output power.

In accordance with another exemplary embodiment, a system for converting direct current (DC) power received from a power source(s) comprises a controlled impedance power controller which further comprises a power converter and a storage device. The power converter comprises a power converter input and is configured to receive DC power at the power converter input, wherein the DC power comprises current and voltage characteristics which may drift over time, wherein the power converter is configured to present a positive equivalent resistive load to the at least one power source over a range of input power levels. The storage device is configured to store converted power from the at least one power source.

In accordance with another exemplary embodiment, a method of storing low power direct current (DC) power received from a power source(s) comprises the steps of: sensing current and voltage characteristics of the low power DC power; selecting, based upon the sensed characteristics, a DC-to-DC converter module and operating mode; selecting parameters, based upon the sensed characteristics, such that a positive equivalent resistive load is presented to the power source(s) at the input of the DC-to-DC converter module over a range of input power levels; and storing the converted power, from the DC-to-DC converter module, in an energy storage device.

In accordance with another exemplary embodiment, a device for collecting radio frequency (RF) power comprises at least two rectenna elements, a power controller, and a DC combining circuit. The at least two rectenna elements comprise one of: (a) a first antenna integrated with a first rectifier and a second antenna integrated with a second rectifier, and (b) a first antenna integrated with a first rectifier and a second rectifier where each is configured for a different polarization. The DC combining circuit is associated with the at least two rectenna elements and the DC combining circuit is configured to dynamically combine the at least two rectenna elements in one of a plurality of series/parallel configurations. The power controller is configured to control the DC combining circuit to achieve a desired overall power output from the at least two rectenna elements.

In accordance with another exemplary embodiment, a method of collecting radio frequency (RF) power using a device comprising at least two rectenna elements, a power controller and a DC combining circuit comprises the steps of: receiving RF waves at each of the at least two rectenna elements; determining which one of a plurality of series/parallel electrical configurations of the at least two rectenna elements will result in a desired overall power output from the at least two rectenna elements; controlling at least one switch in the DC combining circuit to cause it to dynamically reconfigure the connectivity of the at least two rectenna elements in one of a plurality of series/parallel configurations; and storing the overall power output from the at least two rectenna elements in a storage device.

DETAILED DESCRIPTION

Figure 1:
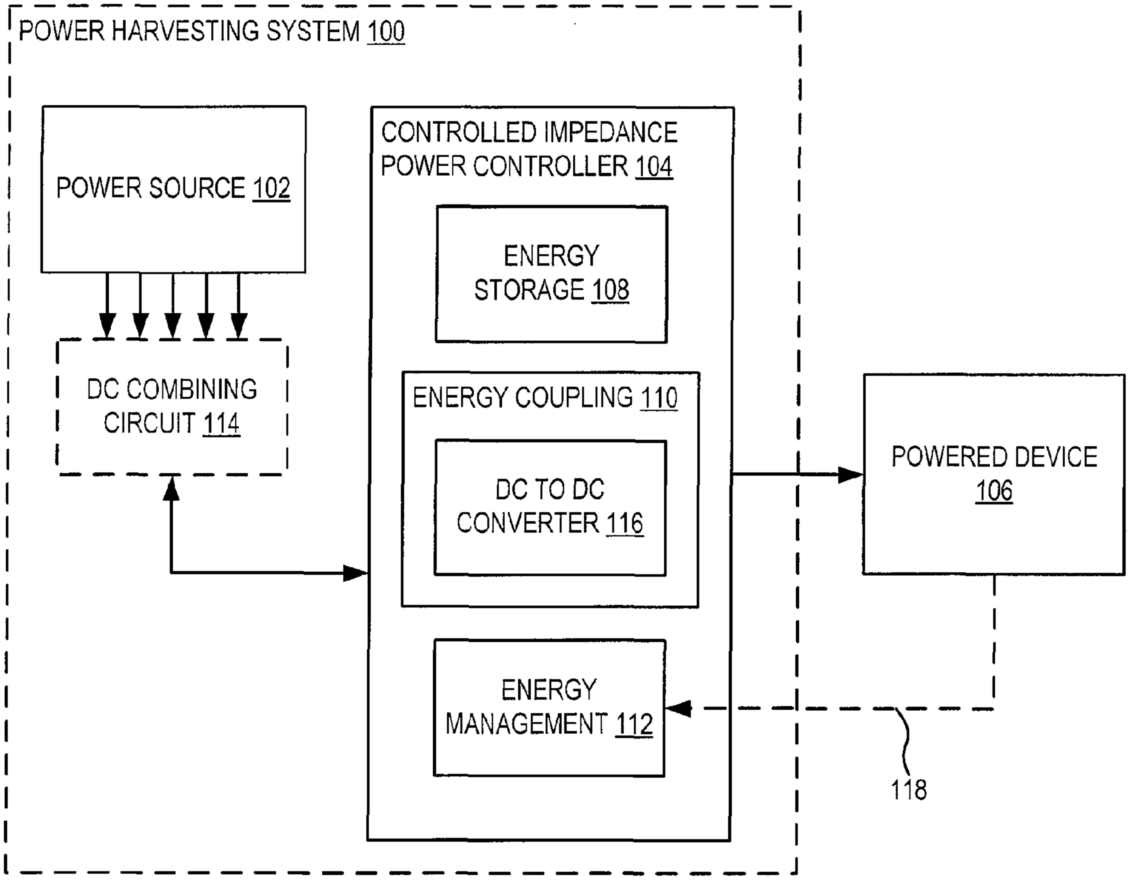
FIG. 1 shows an exemplary embodiment of a power collecting/harvesting system that includes power sources and a controlled impedance, voltage or current power controller.

FIG. 1 shows an embodiment of a power collecting system 100 that includes power sources 102 and a controlled impedance, voltage or current power controller 104. Power harvesting system 100 is illustratively shown powering a powered device 106. Powered device 106 is, for example, a sensor and/or transceiver device. Power source 102 may represent one or more of: a rectenna, a photovoltaic cell, a piezoelectric device or other power collecting device. Although described in various embodiments as a power collecting system or a power harvesting system, it should be understood that the systems, devices and methods described herein may be used for either purpose.

Power controller 104 is illustratively shown with energy storage device 108, energy coupling device 110 and energy management device 112. Energy storage device 108 is for example a battery or a capacitor; it may be internal to power controller 104, as shown, or external to power controller 104 without departing from the scope hereof.

Energy management device 112 instructs energy coupling device 110 to convert energy received from power source 102 into a form suitable for storage by energy storage device 108. Accordingly, energy coupling device 110 may include a DC-to-DC voltage converter 116 that changes the DC voltage received from power source 102 such that it is suitable for storage in energy storage device 108. The DC-to-DC voltage converter 116 may represent a step-up voltage converter or a step down voltage converter. Or, DC-to-DC voltage converter 116 may include a plurality of different types of DC-to-DC voltage converters that are selectively chosen to convert DC power received from power source 102 into a form suitable for storage by energy storage 102.

Energy coupling device 110 is further shown with optional DC combining circuit 114, which operates to combine DC inputs from power source 102 where multiple power sources 102 provide power to controlled impedance power controller 104. DC combining circuit 114 may include one or more switches selected by energy management device 112 to configure connectivity of multiple power sources 102. For example, where power source 102 is a rectenna array (e.g., rectenna array 200, FIG. 2) that has a plurality of antenna elements (e.g., antenna elements 202), depending on sensed characteristics of received power from the aperiodic rectenna, energy management device 112 may control DC combining circuit 114 to configure antenna elements in series and/or parallel for optimum operation. In particular, as power levels, frequencies and polarizations of incident RF waves change, energy management device 112 may reconfigure connectivity of the rectenna array to improve energy collecting/harvesting efficiency.

Energy management device 112 may also receive information from powered device 106 via a signal 118 that indicates power requirements of powered device 106. This information is used by energy management device 112 to optimally configure energy coupling device 110. Thus, in an exemplary embodiment, energy management device 112 may be configured to control energy coupling device 110 based on feedback from powered device 106.

In the following examples, power source 102 is represented by one or more rectennas. However, other power sources may also be used in place of the rectennas shown.

Figure 2:
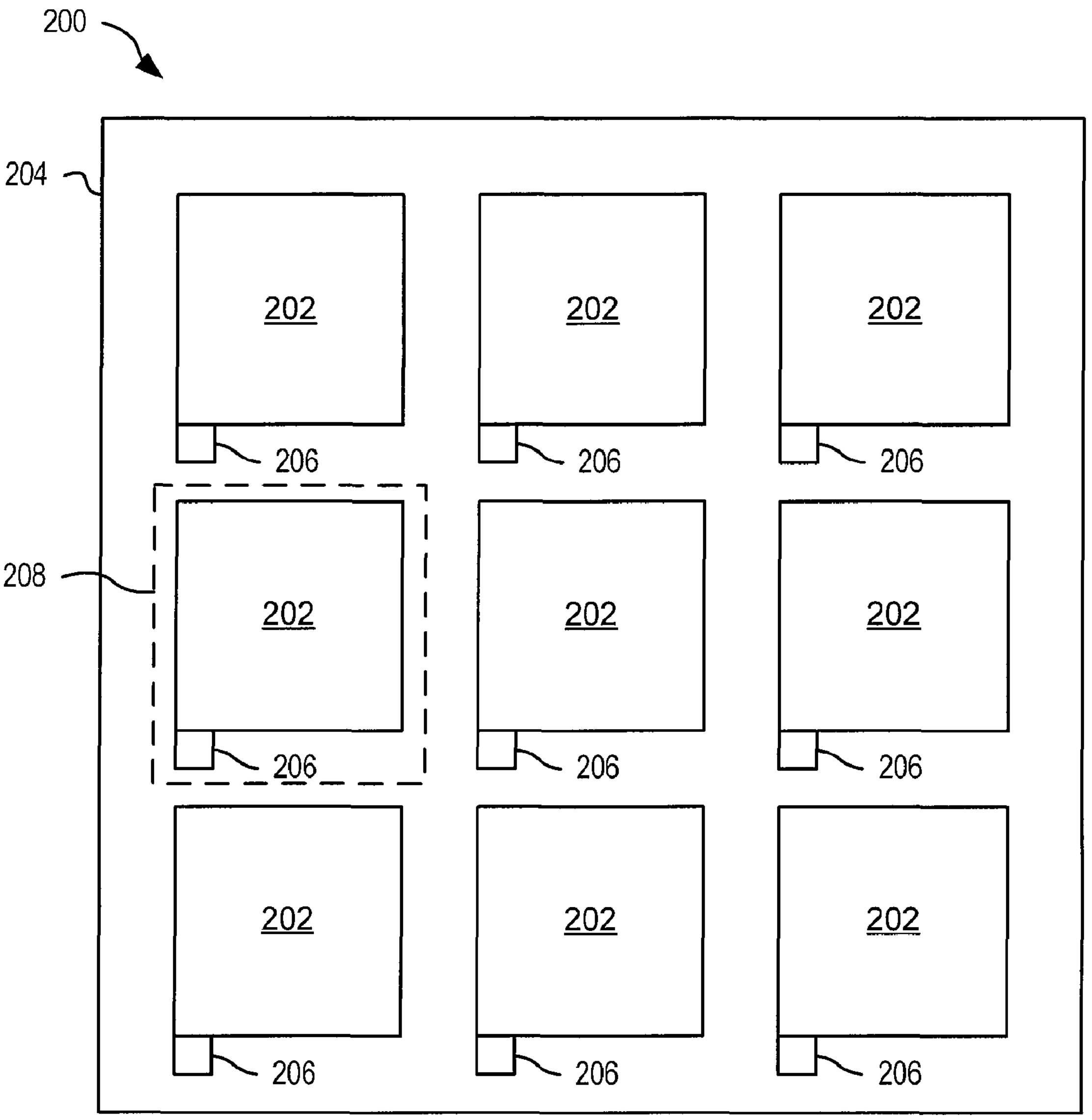
FIG. 2 shows one exemplary periodic and uniform rectenna array.

FIG. 2 shows one exemplary periodic and uniform rectenna array 200, illustrating nine square patch antenna elements 202 on a grounded substrate 204. Each antenna element 202 has a rectifier 206, thereby forming a rectenna 208. Interconnectivity of periodic rectenna array 200 is not shown for clarity of illustration. Size and layout of each antenna element, connectivity of each rectifier thereto and substrate characteristics determine the frequency range and polarization of radio frequency waves received by rectenna array 200.

Array 200 may be formed with alternate antenna designs without departing from the scope hereof. Moreover, additional rectifiers may connect in parallel or series to rectifiers 206, also without departing from the scope hereof.

Figure 3:
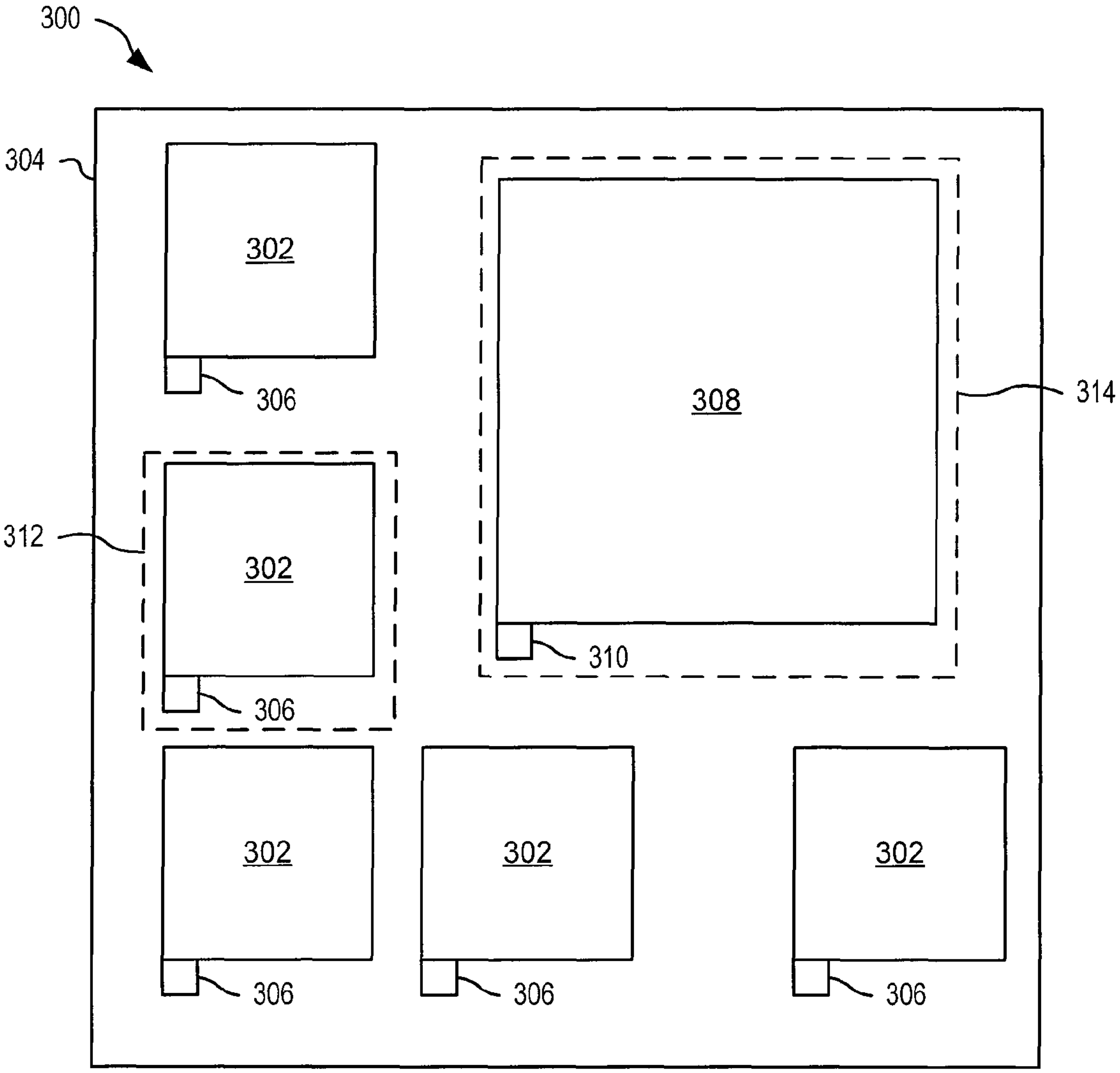
FIG. 3 shows one exemplary aperiodic and non-uniform rectenna array.

FIG. 3 shows one exemplary aperiodic and non-uniform rectenna array 300 with five patch antenna elements 302 of a first size formed on a substrate 304, each antenna element 302 having a rectifier 306 to form a rectenna 312. Aperiodic rectenna array 300 also has a patch antenna element 308 of a second size formed on substrate 304; antenna element 308 has a rectifier 310 thus forming a rectenna 314. Rectenna 312 is designed for receiving radio frequency waves of a first frequency range, and rectenna 314 is designed for receiving radio frequency waves of a second frequency range. Thus, the aperiodic and non-uniform rectenna array 300 may receive radio frequency waves within both the first frequency range and the second frequency range.

Additional or different rectennas may be included within array 300. The frequency range and polarization of the radio frequency waves received by aperiodic non-uniform rectenna array 300 may be determined by the size, layout and type of each antenna element, and/or the connectivity of each rectifier thereto.

Although not shown in FIGS. 2 and 3, connectivity of rectennas 208 within periodic rectenna array 200 and connectivity of rectennas 312 and 314 within aperiodic rectenna array 300 may be based upon, for example, radio frequency waves incident at each rectenna array and the desired power output of the rectenna array. For example, rectennas 208 may be connected in series or parallel, or any suitable series/parallel combination.

Selection of a suitable rectifier topology and rectification device, based upon frequency range and power levels received, is also important for efficient operation of these rectenna arrays.

Multiple periodic or aperiodic, uniform or non-uniform, rectenna arrays may be used to collect/harvest RF energy. For example, output from two periodic rectenna arrays, each having different sized antenna elements (i.e., each receiving RF waves of different frequency ranges and/or polarizations) may be combined for conditioning by controlled impedance (or DC input parameter) power controller 104, FIG. 1.

A rectenna array (e.g., periodic rectenna array 200, FIG. 2) may also be reconfigured during operation. For example, if energy management device 112 determines that output voltage of rectenna array 200 is too high or too low, energy management device 112 may instruct energy coupling device 110 to modify connectivity of rectenna array 200 (e.g., using DC combining circuit 114) to decrease or increase output voltage. DC combining circuit 114 for example contains switching components (e.g., MOSFETs, BJT, IGBT, relays, etc.) that allow dynamic configuration of connectivity to power source 102.

Furthermore, if energy management device 112 determines that output power of the rectenna array is too high or too low, energy management device 112 may instruct energy coupling device 110 to reconfigure antenna elements of rectenna array 200 into parallel and/or serial connectivity combinations, thereby reducing or increasing output voltage and/or current.

Connectivity of one or more rectenna arrays may, for example, be based upon one or more of output voltages, open circuit voltage, short circuit current, output current and output power of one or more antenna elements. In other exemplary embodiments, the connectivity may be based on other factors such as the battery level or RF input power. Groups of antenna elements producing similar currents may be connected in series, whereas groups of antenna elements producing similar voltages may be connected in parallel. Operating parameters of the power controller 104 may also be based upon one or more of output voltages, open circuit voltage, short circuit current, output current and output power of one or more antenna elements and/or other power sources.

Controlled impedance power controller 104 may include one or more sensors and/or sense circuits configured to monitor characteristics of input power and/or other parameters. Thus, in an exemplary embodiment, the system is configured to sense the following parameter(s): an open circuit voltage, a short circuit current, an operating voltage and current of the power source(s), and the output current and voltage of the power converter; and the controlled impedance power controller is further configured to monitor the sensed parameters, and to present a positive equivalent resistive load to the power source(s) based on those monitored sensed parameters.

The rectenna array may be designed such that RF power from two or more antenna elements are combined before rectification. Furthermore, it should be understood that two rectenna elements may comprise a first antenna integrated with a first rectifier and a second antenna integrated with a second rectifier. In another embodiment, two rectenna elements may comprise a single antenna integrated with first and second rectifiers where each rectifier is configured for a different polarization.

Thus, in accordance with an exemplary embodiment, a positive equivalent resistive load is presented to the power source(s). This is a significantly different solution than that employed in the prior art. It has always been a challenge for power management to maintain maximum output power over a wide range of operating conditions. Many techniques to do so by way of maximum power point tracking (MPPT) are well known in the higher power photovoltaic and wind power systems. Some prior art MPPT systems include: perturbation and observation method, incremental conductance method, power-feedback control, and fuzzy logic. These approaches have their drawbacks, particularly when used in conjunction with relatively 'low power' power sources. In particular, these approaches often require a high power overhead due to complex control circuitry.

In contrast, in an exemplary embodiment of the present invention, energy is collected/harvested near maximum output from low power sources (by way of non limiting example 1 mW to 100 μW range) by loading the power sources with a constant resistance. Any simple circuit configured to load the power source with a constant resistance may be used. In an exemplary embodiment, a power converter is configured to act as a constant positive resistance at its input port while transferring energy to an output capacitor or battery at voltages appropriate for the sensor load application. The converter matches the source characteristics over a wide range of input power and thus does not need to constantly search for the maximum power point. Many different well known power converter topologies and control approaches may be used to achieve the near resistor emulation at the input port.

By way of example, approaches for resistor emulation at the input port (without current feedback) include: boost type converters in critical conduction mode (CRM) and buck-boost type converters in discontinuous conduction mode (DCM). Thus, the converters may be operated continuously or in pulsed mode. One exemplary topology is the buck-boost converter operating in fixed-frequency DCM using a floating input voltage source to allow for a non-inverted output and a two-switch implementation. Another exemplary topology is a buck-boost converter in variable-frequency critical conduction mode (CRM). Another exemplary topology is a boost converter operated in DCM or in CRM. Another exemplary topology is a buck converter operated in DCM or CRM. The selection of a converter and mode of operation depends on the characteristics and variations in the power source and energy storage and upon the amount of acceptable power consumption by the converter control circuitry. Such design considerations are expounded upon in "Resistor Emulation Approach to Low Power RF Energy Harvesting", T. Paing, J. Shin, R. Zane, Z. Popovic, IEEE Transactions on Power Electronics, accepted for publication Nov. 8, 2007, to be published in May 2008 issue, incorporated herein by reference.

Thus, the system may comprise a controlled impedance power controller comprising for example a first type of DC to DC converter selected from the group of: a four-switch buck-boost converter, a two-switch buck-boost converter, a boost converter, a buck converter, and a switched capacitor converter.

Furthermore, in an exemplary embodiment, the system may comprise a controlled impedance power controller comprising one of (a) an isolated step up, down, or up/down converter and (b) a non-isolated step up, down or up/down converter, wherein the step up, down or up/down converter comprises at least one of the following power converters: buck, boost, buck-boost, Flyback, SEPIC, and Cuk.

Furthermore, in an exemplary embodiment, the system may comprise a controlled impedance power controller operating in one of (1) an open loop in one of (x) discontinuous conduction mode and (y) critical conduction mode, and (2) a closed loop in continuous conduction mode; and wherein the controlled impedance power controller selects a DC-to-DC converter module and operating mode to achieve a desired input impedance for proper loading of the power source(s).

It will be appreciated then that any suitable converter and operation mode may be used that presents a positive equivalent resistive load to the power source in a manner suitable for low power sources.

Figure 15:
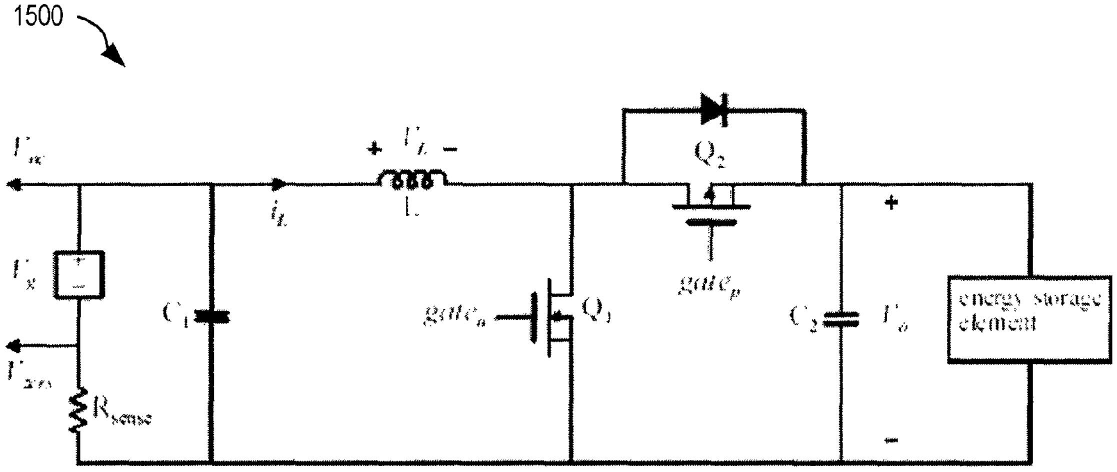
FIG. 15 shows one exemplary circuit for a boost converter in variable frequency critical conduction mode (CRM).
Figure 16:
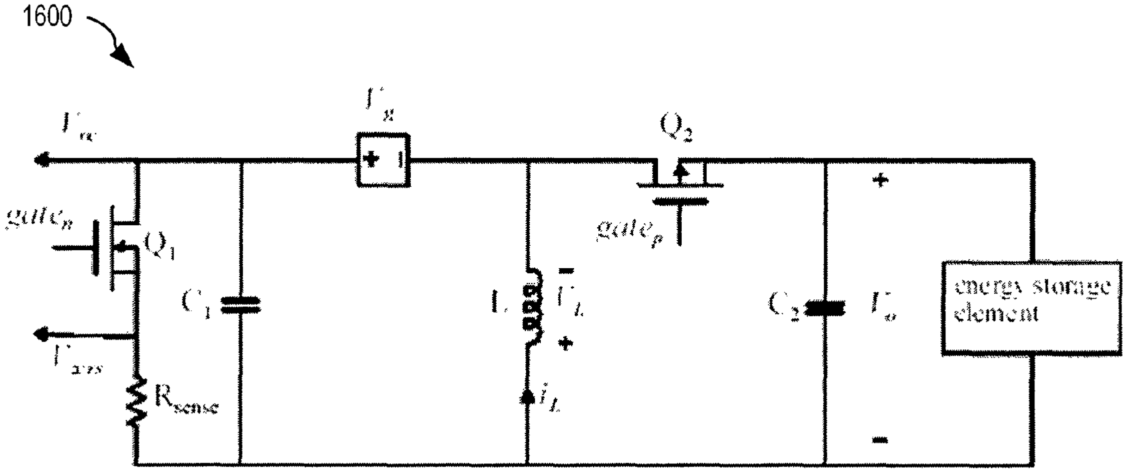
FIG. 16 shows one exemplary circuit for a buck-boost converter in fixed frequency discontinuous conduction mode (DCM).
Figure 18:
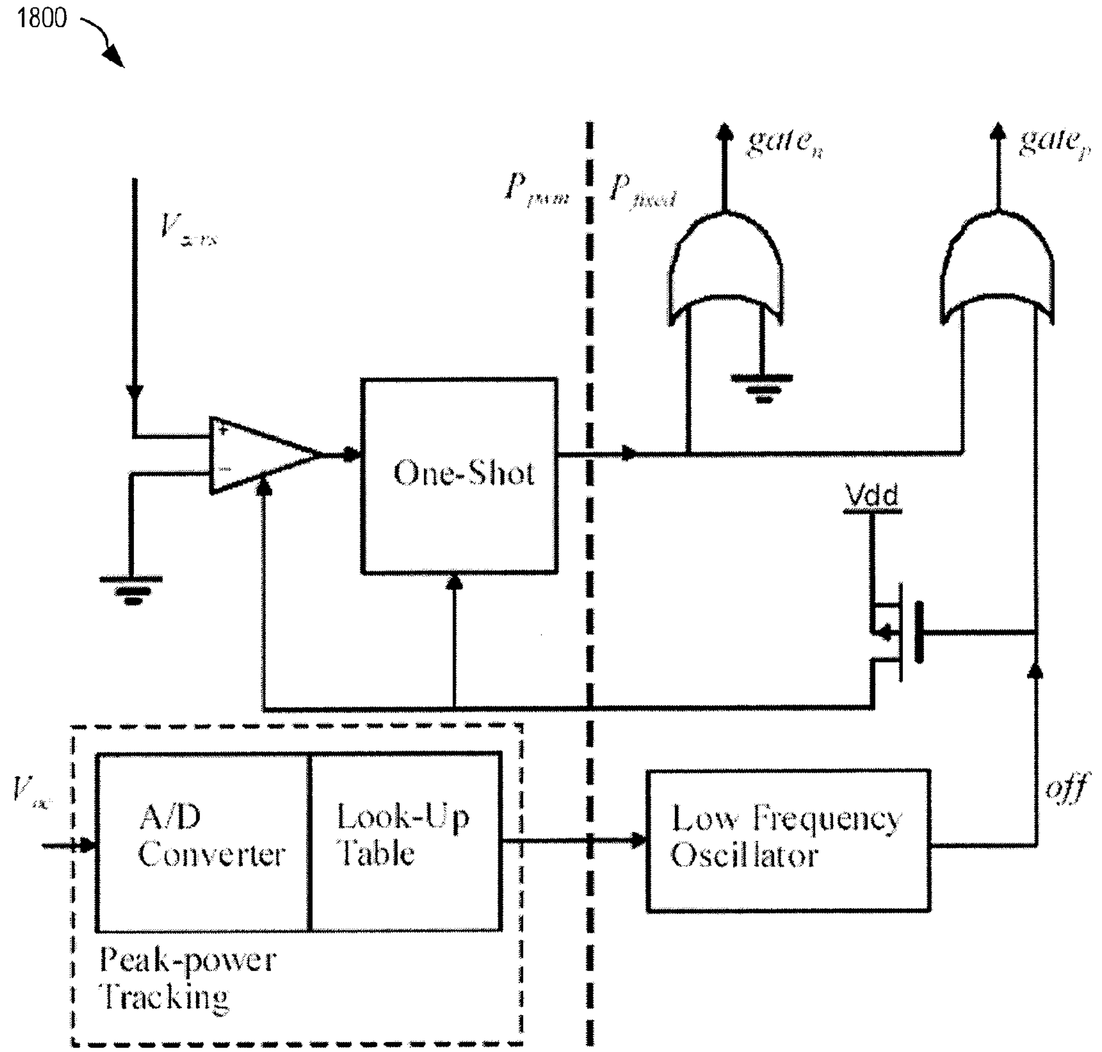
FIG. 18 shows one exemplary circuit for generating the gate driving signals for the circuit of FIG. 15.
Figure 19:
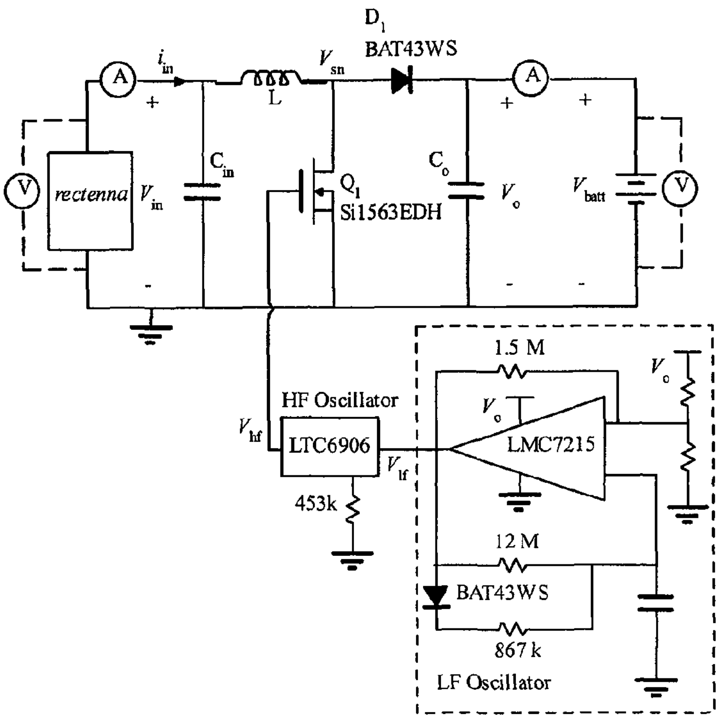
FIG. 19 shows an exemplary schematic for a boost converter, including an experimental meter.

FIGS. 15, 16 and 18, described below, show exemplary circuits for presenting desired impedance to one or more power sources (e.g., power source 102, FIG. 1, periodic rectenna array 200, FIG. 2, and aperiodic rectenna array 300, FIG. 3). Prior art DC-to-DC converters typically implement inverse resistive loading: as input power decreases, resistance presented to the input power source is reduced, thereby further loading the input source. Controlled impedance power controller 104, on the other hand, maintains resistance presented to the input source at a substantially constant level, even as input power levels vary. The controlled impedance may also be varied based on sensed conditions of the power source to emulate a desired impedance, input voltage or input current in order to improve the energy collecting/harvesting efficiency, for example by emulating a positive equivalent resistive load where resistance presented to the source increases as input power decreases. In accordance with an exemplary embodiment: (1) said positive equivalent resistive load is tuned to approximately match the low frequency output impedance of the power source(s); and/or (2) said positive equivalent resistive load is tuned to approximately maximize the output power of the power source(s). In accordance with another exemplary embodiment, the positive equivalent resistive load corresponds to an optimal load resistance of the power source(s) over a range of input power levels.

Selection of circuitry for power controller 104 depends on the desired application. Where high efficiency of energy collecting/harvesting is required, additional circuitry may be included to sense characteristics of the input power, whereas if the power source provides ample power, high efficiency may not be necessary, allowing simplified circuitry to be used.

Alternative power sources may be combined for use with an RF power source 102. For example, an RF wave rectenna array, a mechanical generator and a photovoltaic cell may be used as input to combining circuit 114 and power controller 104. Power controller 104 may then dynamically configure these inputs depending on sensed input characteristics and/or desired output requirements in order to improve energy collecting/harvesting efficiency. In particular, energy sources may be combined in such a way (e.g., parallel and series combinations) as to provide biasing to each other, thereby increasing overall energy collecting/harvesting efficiency. Optionally, powered device 106 may provide feedback to energy management device 112 to indicate its power needs. Energy management device 112 may then configure power input connectivity as needed to provide the necessary power.

Figure 4:
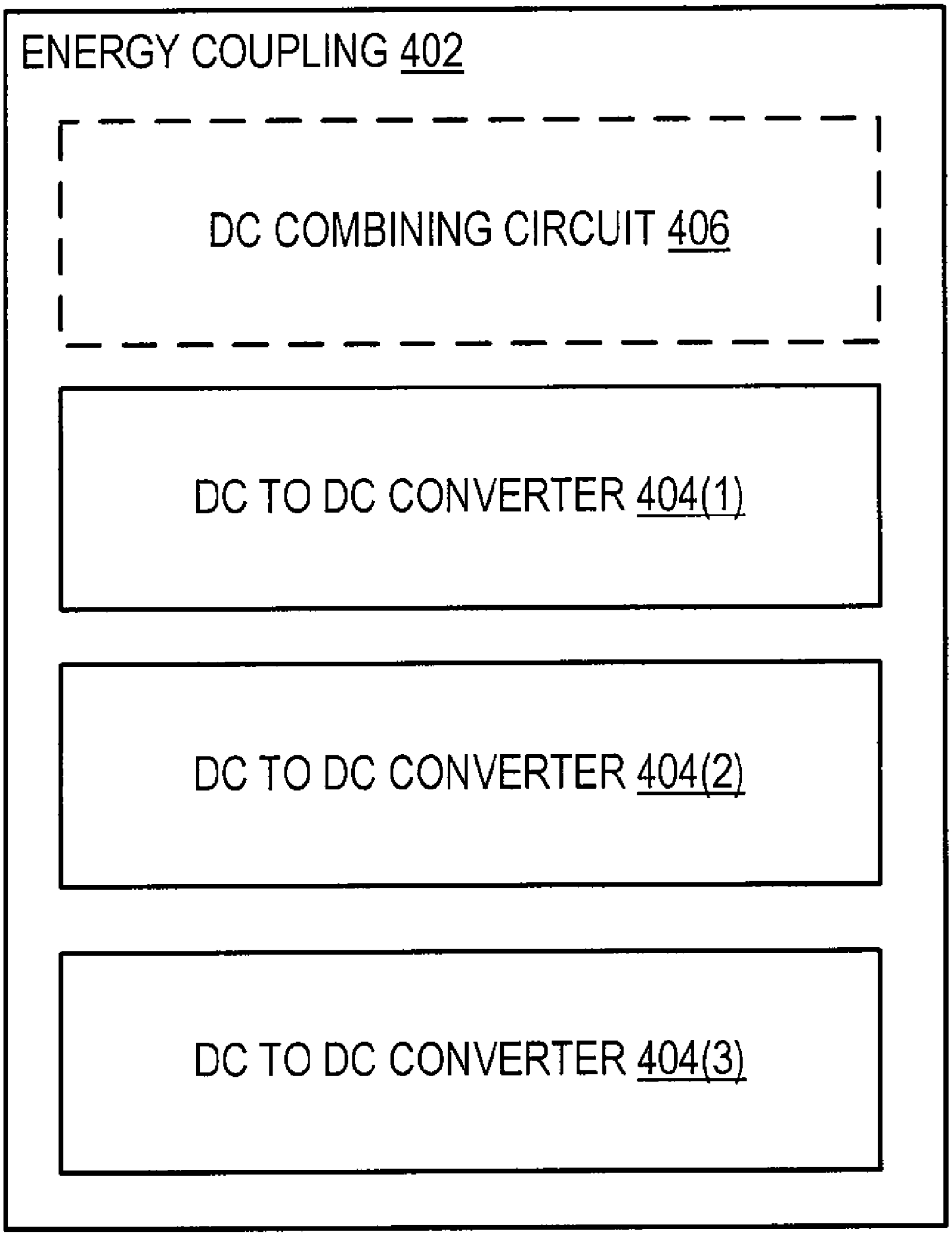
FIG. 4 illustrates exemplary energy coupling including a plurality of DC-to-DC converters.

Power controller 104 may also transfer energy from energy storage device 108 to one or more power source 102 outputs in order to increase the overall energy collecting/harvesting efficiency. For example, energy can be transferred to the DC output of a rectenna for improved biasing, resulting in improved energy collecting/harvesting efficiency.

Where input power conditions vary, DC-to-DC converter 116 may be selected from a plurality of converters to match the input power characteristics. FIG. 4 shows one exemplary energy coupling 402 that includes a plurality of DC-to-DC converters 404 and an optional DC combining circuit 406. DC combining circuit 406 may represent DC combining circuit 114, FIG. 1. Energy coupling 402 may represent energy coupling device 110, FIG. 1. For example, each of DC-to-DC converters 404 may represent one of: a four-switch buck-boost converter, a two-switch buck-boost converter, a boost converter operating in critical-conduction mode, a buck converter controlled to regulate input current or voltage as a function of the corresponding input voltage or current, and a switched capacitor converter. DC-to-DC converters 404 are selectable based upon input power characteristics and the type of storage device used for energy storage device 108. As input power characteristics change, energy management device 112 may select an alternate DC-to-DC converter as needed.

Where input power conditions vary, energy management device 112 may change the operating characteristics of DC-to-DC converter 116 to match the emulated input impedance of the converter to the desired load of the power source 102. For example, based upon one or more of: sensed open circuit voltage of power source 102, short circuit current of power source 102, operating voltage and current of power source 102, and output power of power source 102, characteristics of DC-to-DC converter 116 may be adjusted to emulate an appropriate resistance.

Figure 5:
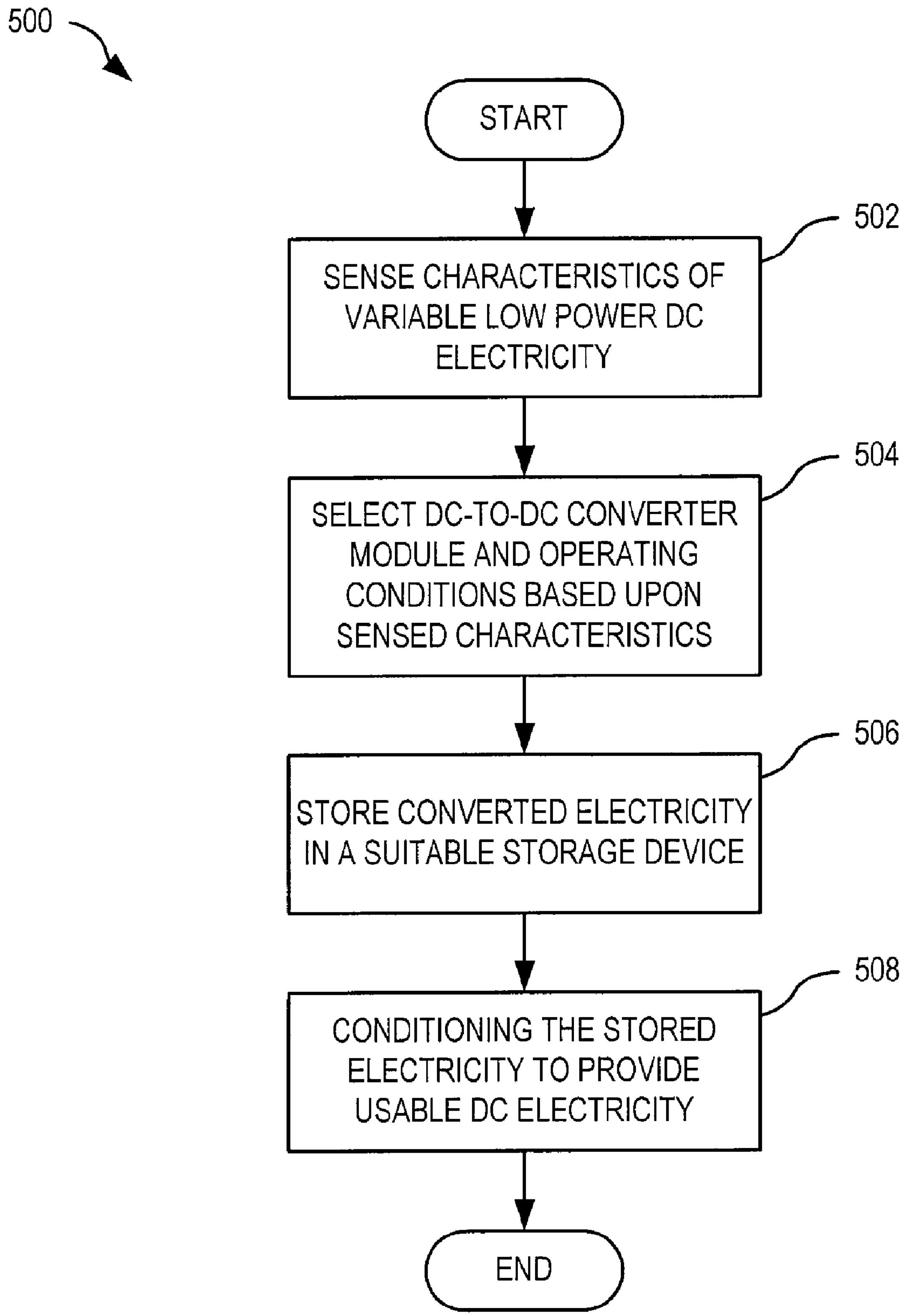
FIG. 5 is a flowchart illustrating one exemplary process for converting variable power DC power into usable DC power.

FIG. 5 is a flowchart illustrating one process 500 for converting variable power DC power into usable DC power, in accordance with an exemplary embodiment. In an exemplary embodiment, process 500 is performed by controller 104, FIG. 1. In further exemplary embodiments, process 500 senses characteristics of the variable low power DC power (step 502) and then selects (step 504), a DC-to-DC converter module and operating characteristics based upon the sensed characteristics, to convert the variable power DC electric into power suitable for storage. The power suitable for storage may then be stored (step 506). For example, the power may be stored in energy storage device 108, FIG. 1. The stored energy may be conditioned into the usable power (step 508). For example, the energy from energy storage device 108 may be conditioned and provided as DC power to powered device 106.

Figure 6:
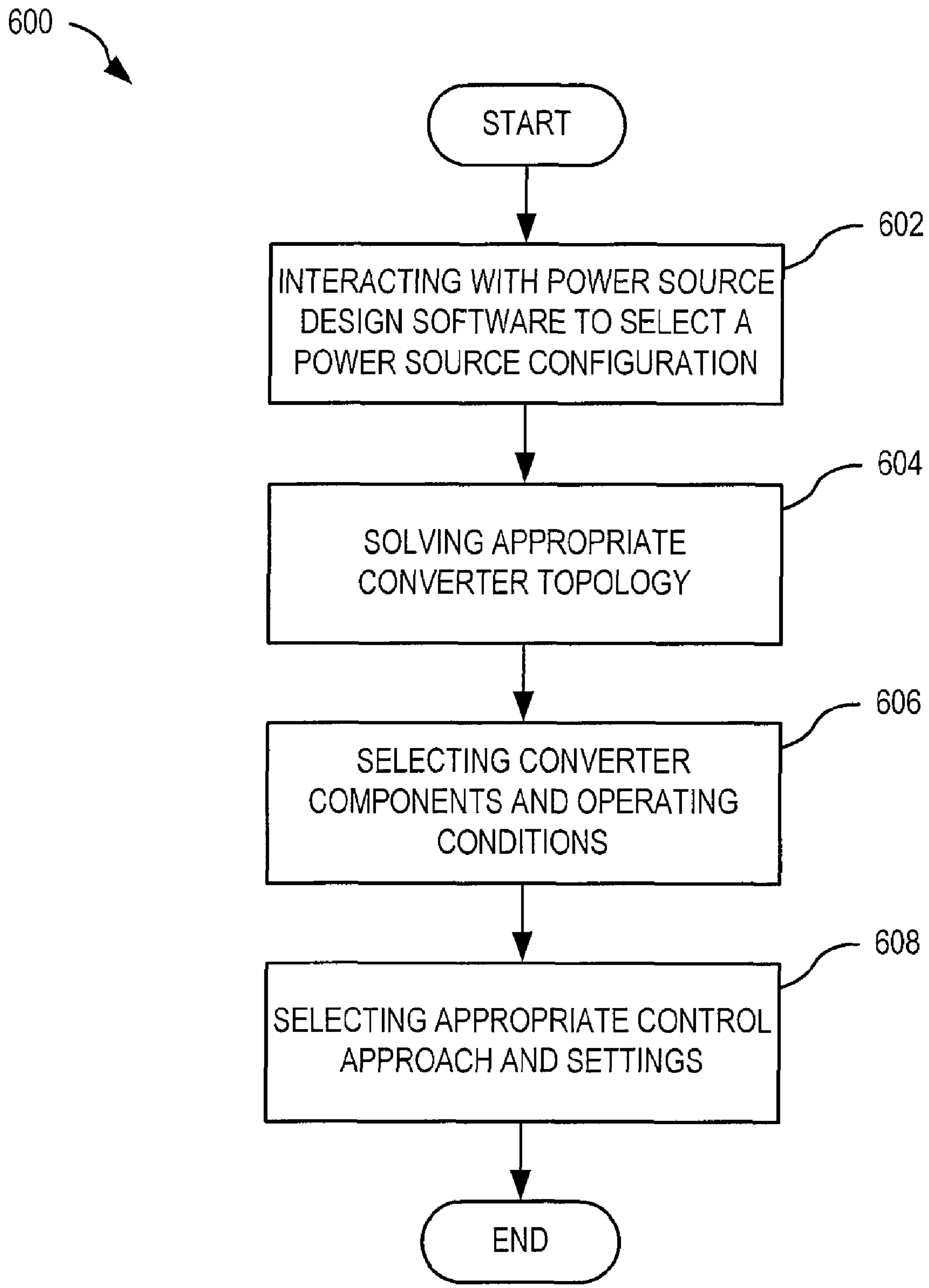
FIG. 6 is a flowchart illustrating one process for designing a system for collecting/harvesting energy from a power source.

FIG. 6 is a flowchart illustrating one process 600 for designing a system for collecting/harvesting energy from a power source. In accordance with an exemplary embodiment, process 600 interacts with power source design software to select a power source configuration (step 602). Additionally, process 600 may solve the appropriate converter topology (step 604). Process 600 may also select the converter components and operating conditions (step 606). Also, process 600 may select the appropriate control approach and settings (step 608).

Figure 7:
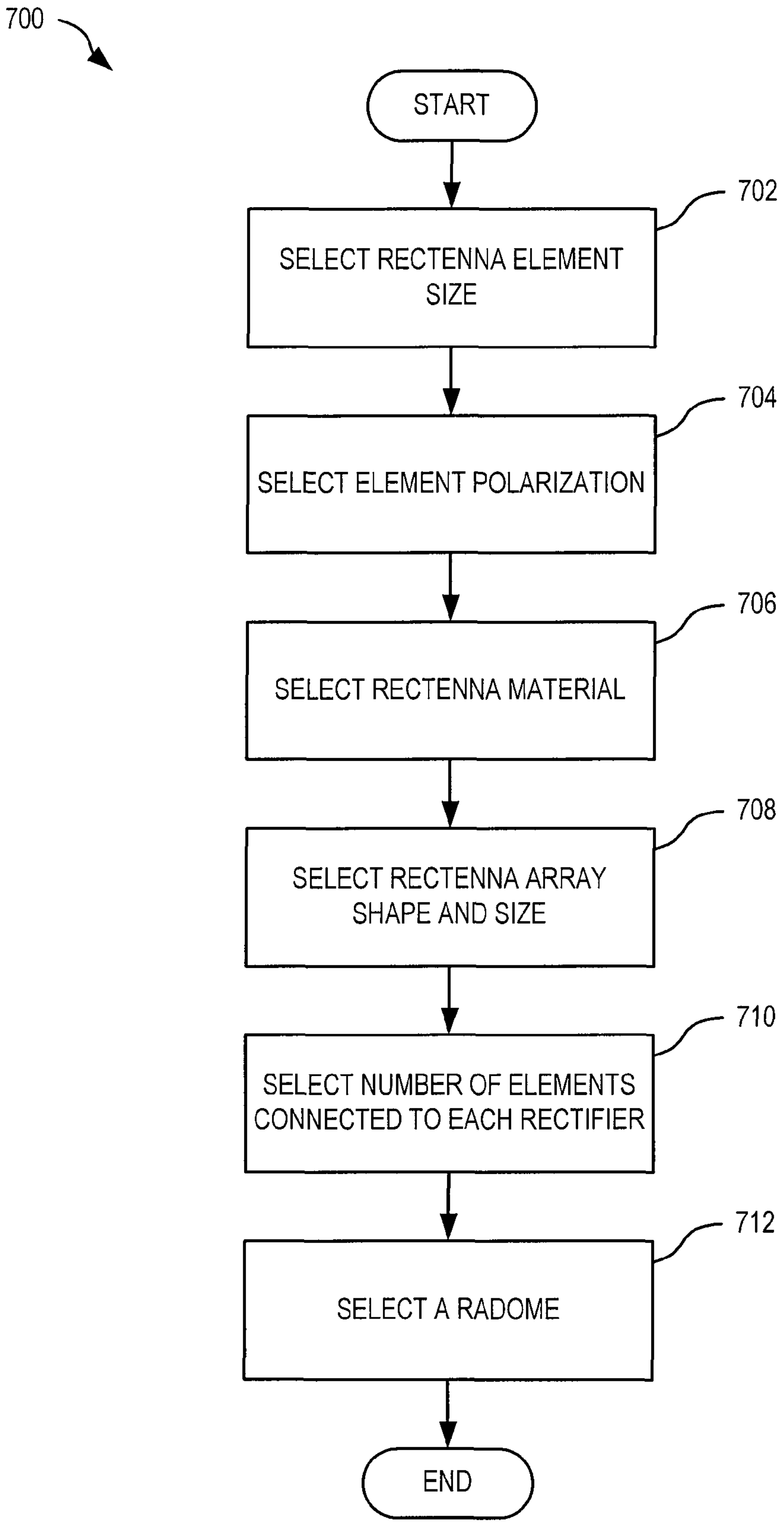
FIG. 7 is a flowchart illustrating one process for designing a rectenna.

FIG. 7 is a flowchart illustrating one process 700 for designing a rectenna. In an exemplary embodiment, process 700 selects the element size of the rectenna based upon available area, incident radiation power levels and/or operating frequency range (step 702). Additionally, process 700 may select element polarization based upon the RF environment of operation (step 704). Furthermore, process 700 may select rectenna material based upon propagation medium and frequency range (step 706). Also, process 700 may select a shape and size for the rectenna array based upon required output power levels, available power storage, operational duty cycles and available space (step 708). Process 700 may also select a number of elements connected to each rectifier (step 710), and select a radome appropriate for intended use (step 712).

Figure 8:
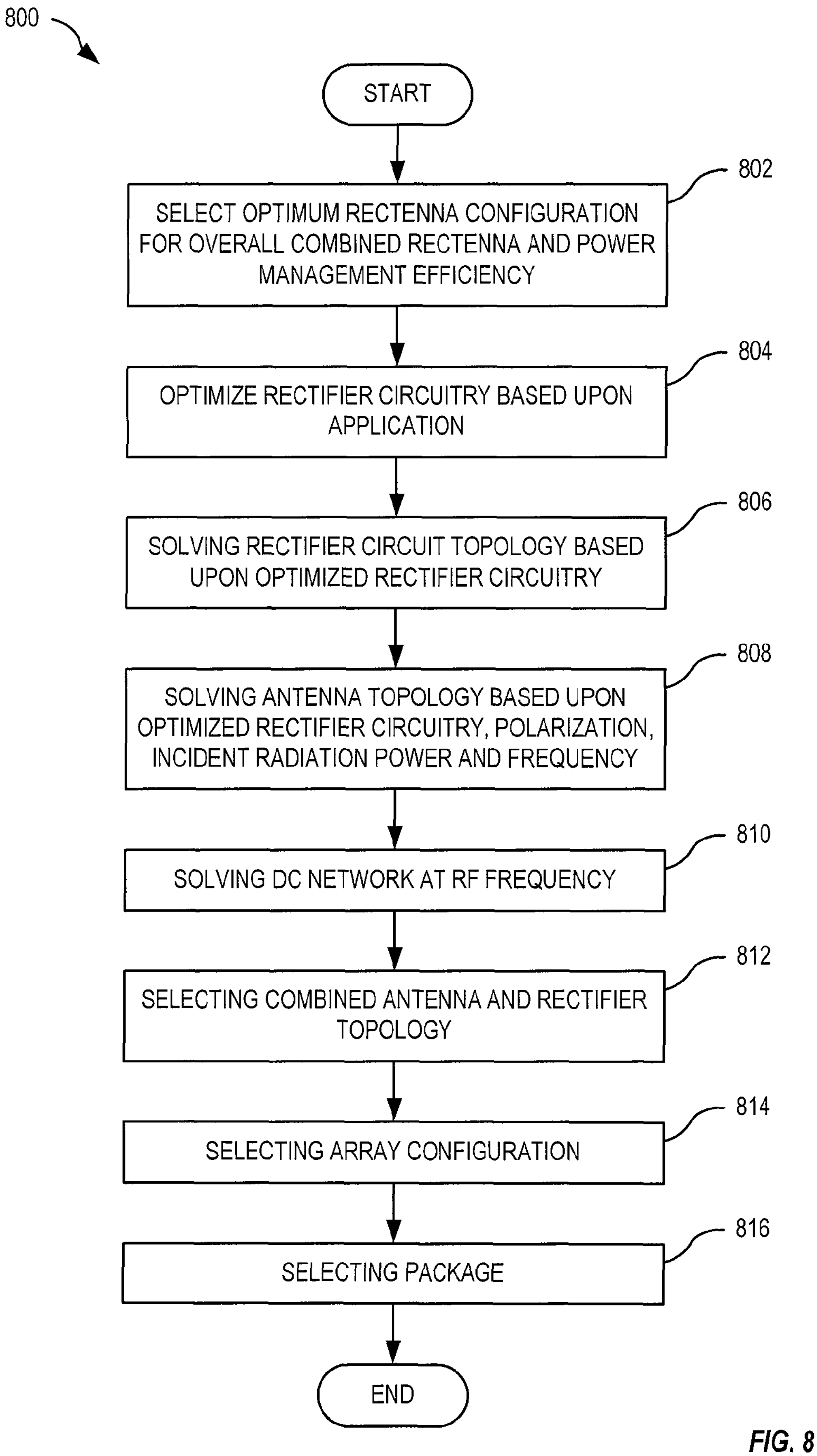
FIG. 8 is a flowchart illustrating another exemplary process for designing a rectenna.

FIG. 8 is a flowchart illustrating another exemplary process 800 for designing a rectenna. In accordance with an exemplary embodiment, process 800 may use power management design software to interactively select an optimum rectenna configuration for overall combined rectenna and power management efficiency (step 802). Process 800 may optimize the selected rectenna circuitry based upon application (step 804). In further exemplary embodiments, process 800 solves rectifier circuit topology based upon optimized rectifier circuitry (step 806). Also, process 800 may solve antenna topology based upon optimized rectifier circuitry, polarization, incident radiation power level and frequency using full-wave electromagnetic simulations (step 808). Process 800 may further solve the DC network at RF frequencies using a combination of full-wave electromagnetic and high-frequency circuit simulations (step 810). Moreover, process 800 may select combined antenna and rectifier topology (step 812). Process 800 may select an appropriate rectenna array configuration (step 814). Also, process 800 may select an appropriate package for integration with the power manager based upon simulation of the package for RF compatibility (step 816).

Figure 9:
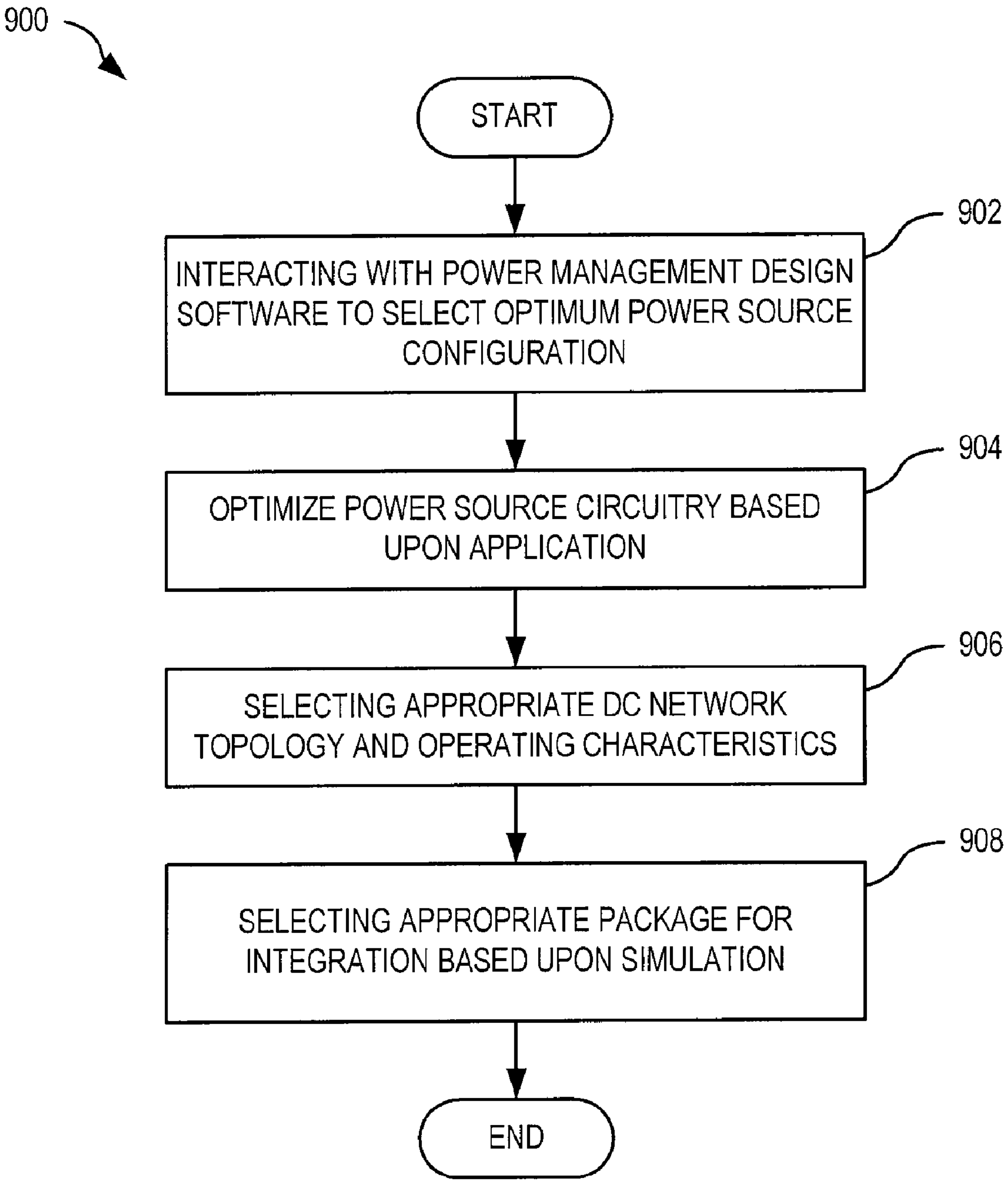
FIG. 9 is a flowchart illustrating one exemplary process for designing a system for collecting/harvesting energy from power sources.

FIG. 9 is a flowchart illustrating one process 900 for designing a system for collecting/harvesting energy from power sources. In accordance with an exemplary embodiment, process 900 interacts with power source design software to select one or more desired power sources for overall combined power source and power manager efficiency (step 902). Process 900 may then solve for an appropriate converter topology (step 904). Moreover, process 900 may select converter components and operating conditions for maximum efficiency based upon selected power source configuration and output characteristics over designated incident power characteristics (step 906). Also, process 900 may be configured to select an appropriate control approach and settings for maximum overall system efficiency over given system characteristics (step 908).

Figure 10:
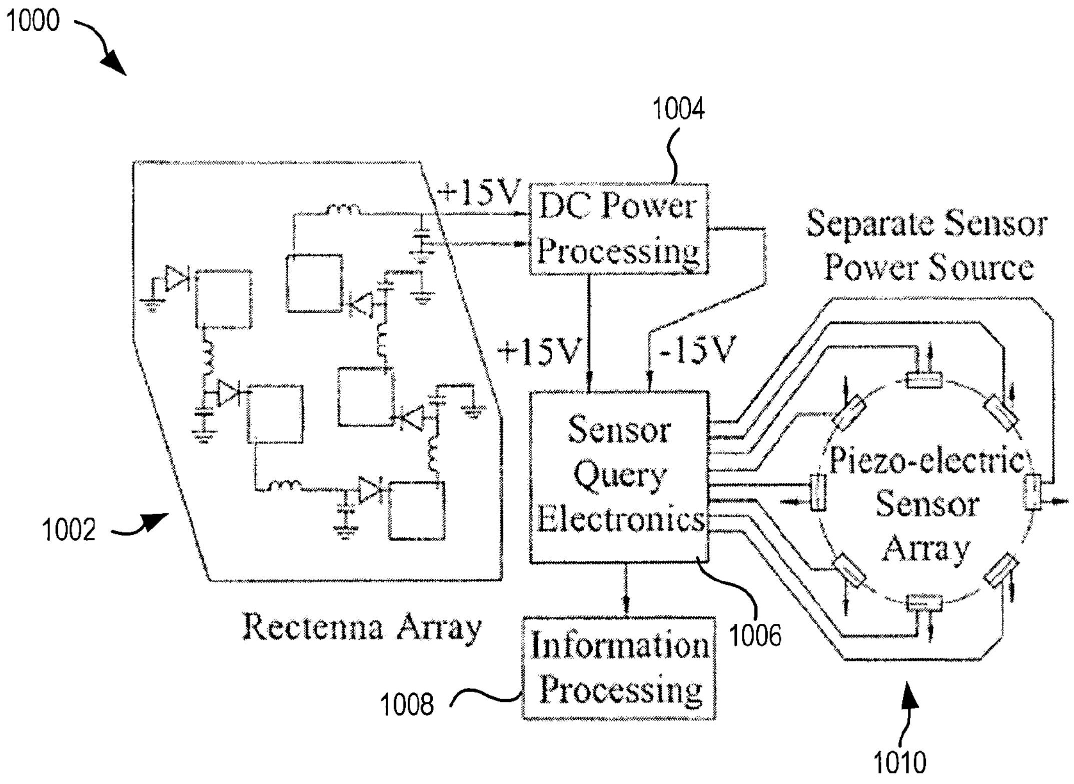
FIG. 10 shows one exemplary block diagram of one exemplary rectenna and sensor system embodiment.

FIG. 10 shows a block diagram of one exemplary rectenna and sensor system 1000. In particular, system 1000 has a rectenna array 1002, DC power processing 1004, sensor query electronics 1006, information processing 1008 and a piezoelectric sensor array 1010. In one example, system 1000 is used to sense structural failures from fatigue within an aircraft. Rectenna array 1002 is formed on a flexible substrate that may be conformed to a moderate curve of an aircraft.

Figure 11:
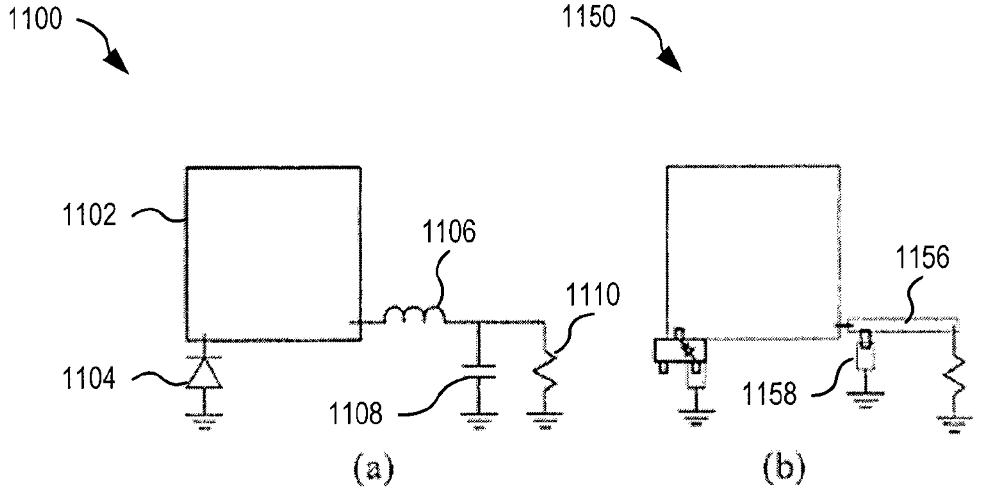
FIG. 11 shows an exemplary model and a layout of a rectenna.

FIG. 11 shows an exemplary model 1100 and a layout 1150 of an ADS rectenna. Model 1100 is shown with an antenna 1102, a diode 1104, an inductor 1106, a capacitor 1108 and a resistor 1110. As shown in layout 1150, a commercial lumped element capacitor 1158 representing capacitor 1108 and a small 0.24 mm diameter wire 1156 representing inductor 1106 provide suitable impedance for an output filter of the rectenna. In one exemplary embodiment, output voltage of the rectenna is measured across a variable resistor and the DC power is calculated as $V^2/R$.

Figure 12:
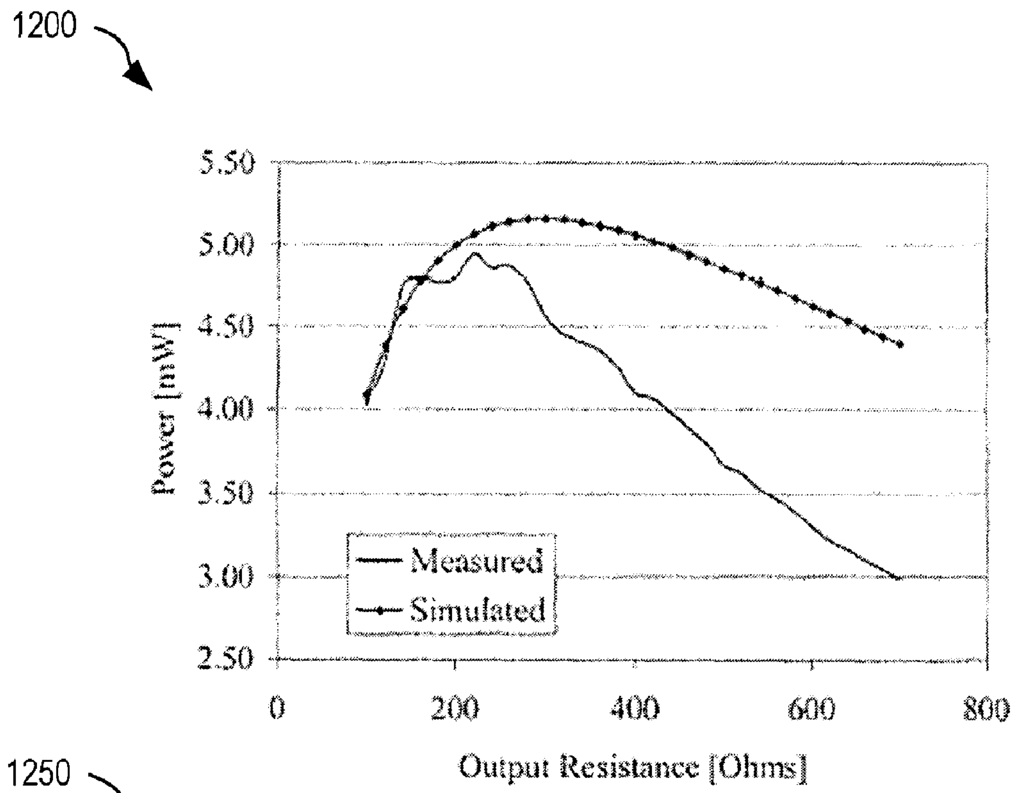
FIG. 12 shows an exemplary graph illustrating simulated and measured output power of the rectenna of FIG. 11 as a function of output resistance, and an exemplary graph illustrating simulated and measured output voltage of the rectenna of FIG. 11 as a function of output resistance.
Figure 12:
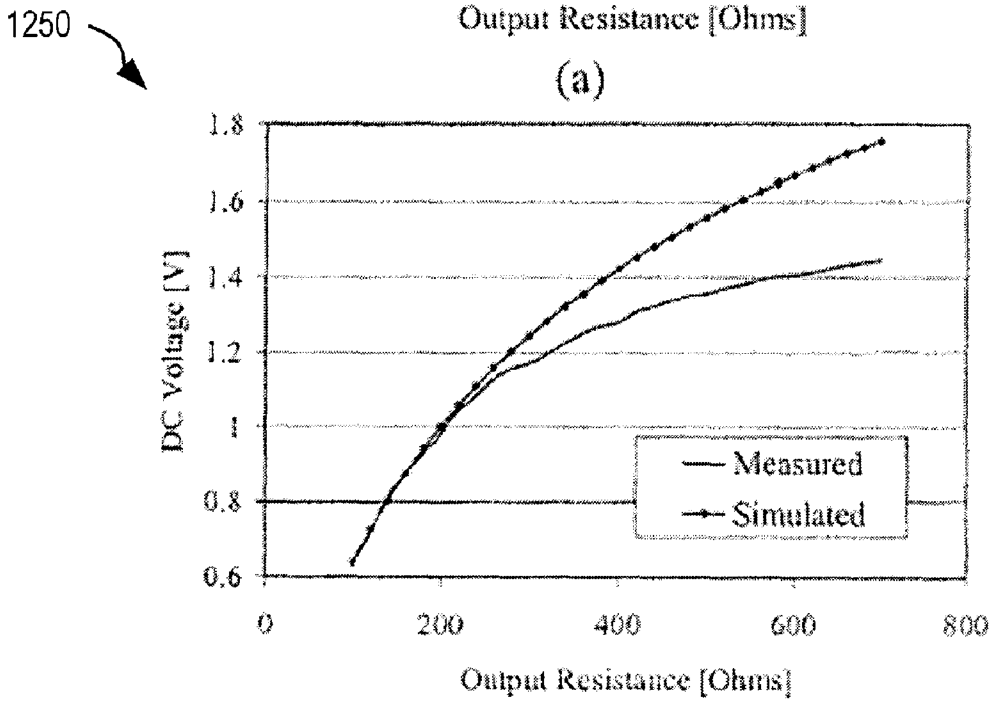

FIG. 12 shows an exemplary graph 1200 illustrating simulated and measured output power of the rectenna associated with FIG. 11 as a function of output resistance, and an exemplary graph 1250 illustrating simulated and measured output voltage of such a rectenna as a function of output resistance.

Figure 13:
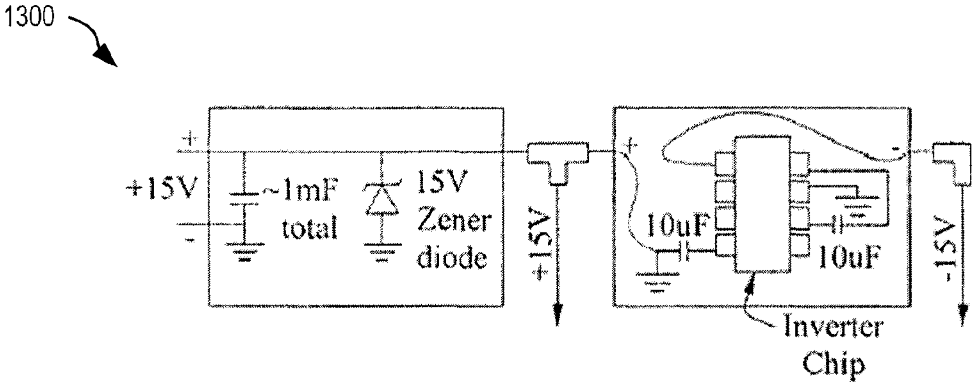
FIG. 13 shows a block diagram illustrating one exemplary DC power processing circuit for obtaining plus and minus 15V power.

FIG. 13 shows a block diagram illustrating one exemplary DC power processing circuit 1300 for obtaining plus and minus 15V power. Circuit 1300 is powered, for example, by an array of rectenna 1101, FIG. 11, not shown.

Figure 14:
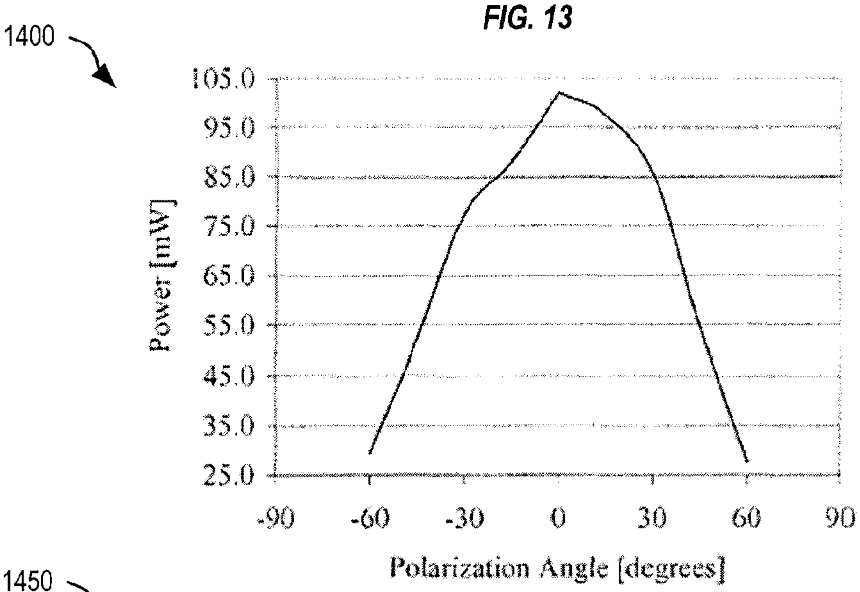
FIG. 14 shows one exemplary graph illustrating measured DC output power of the circuit of FIG. 13 against polarization angle of radiation incident on the rectenna array and one exemplary graph illustrating DC output power and efficiency of the circuit of FIG. 13 against power received by the rectenna array
Figure 14:
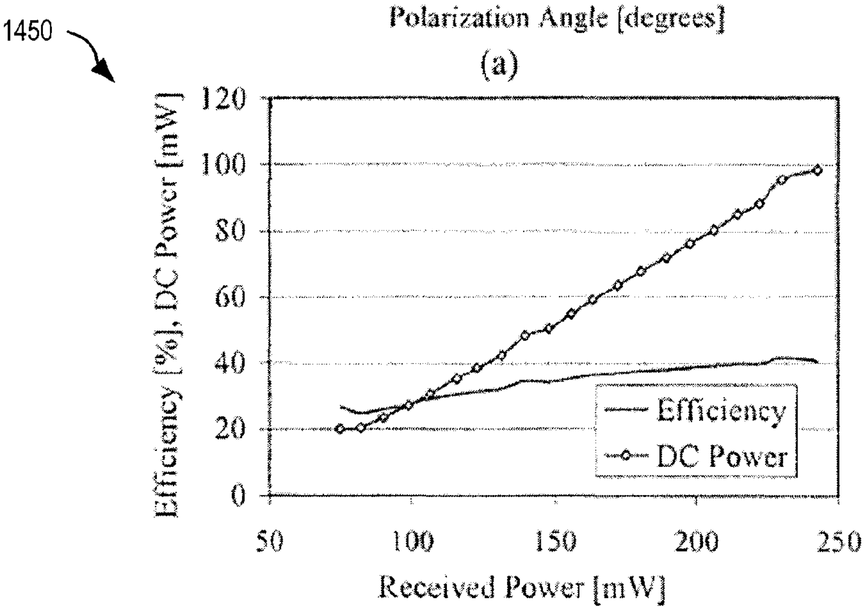

FIG. 14 shows one exemplary graph 1400 illustrating measured DC output power of circuit 1300 against polarization angle of incident radiation against the rectenna array and one exemplary graph 1450 illustrating DC output power and efficiency of circuit 1300 against received power by the rectenna array.

FIG. 15 shows one exemplary circuit 1500 for a boost converter in variable frequency critical conduction mode (CRM). FIG. 16 shows one exemplary circuit 1600 for a buck-boost converter in fixed frequency discontinuous conduction mode (DCM). Note that in both circuits 1500 and 1600, a two-switch implementation is possible due to the floating input power source. The converter circuits 1500, 1600 may be operated continuously at higher input power levels, or operated in a pulsed mode at lower power levels, as shown in waveforms 1700 and 1750 of FIG. 17. In another exemplary embodiment, the same concept could be implemented with a square wave waveform.

Figure 17:
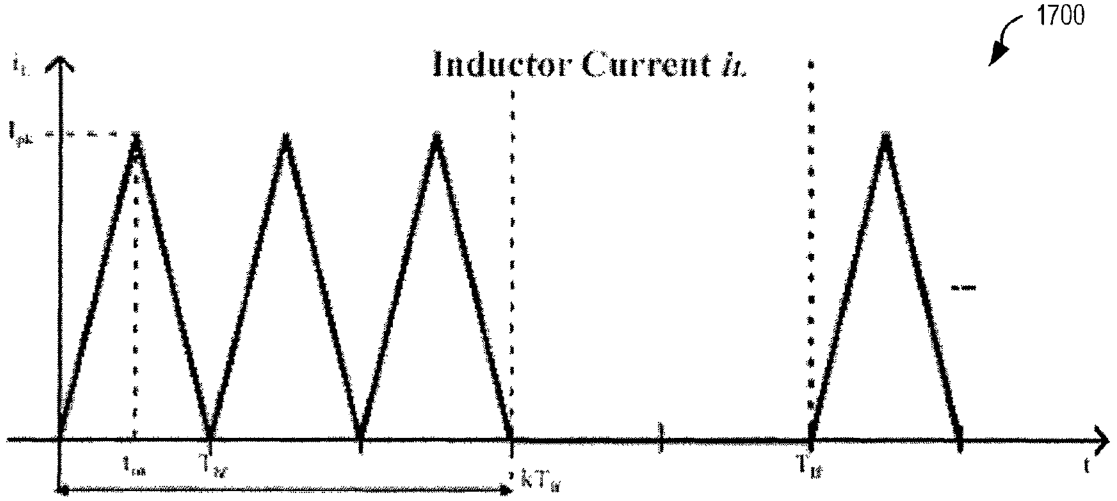
FIG. 17 shows three exemplary waveforms illustrating operation of the converter circuit of FIG. 15.
Figure 17:
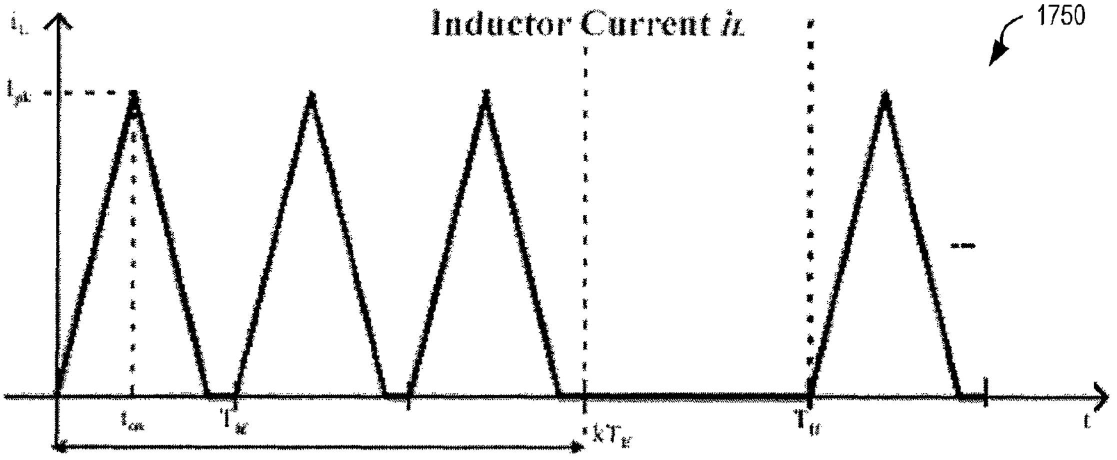

In particular, waveform 1700 of FIG. 17 shows inductor current under steady-state operation of circuit 1500, FIG. 15. In a first transition of circuit 1500, transistor $Q_1$, is turned on and $Q_2$ is turned off during $t_{on}$, and thus the inductor current ramps up from zero to $i_{pk}$ over that time. After this transition, $Q_1$ is turned off, and $Q_2$ is turned on to move the energy to the load. This second transition lasts until the inductor current drops to zero. When this occurs, the first transition is repeated. The converter of circuit 1500 runs in this mode for a certain duty cycle, k, of a low frequency period, $T_{lf}$. At $kT_{lf}$, the converter turns off and starts up again at $T_{lf}$. By adjusting k or $t_{on}$, the emulated input resistance seen by the source is changed. Changing the emulated input resistance to match the optimum rectenna load maximizes energy collecting/harvesting.

In circuit 1500, the input voltage source is shown as $V_g$, and the output energy is stored in an energy storage element such as a capacitor or micro-battery. The voltage, $V_{zcrs}$, is a sense point used by a comparator to find a zero crossing of the inductor current. Optionally, the open circuit voltage, $V_{oc}$, or a short circuit current, $I_{sc}$, may be used by additional control circuitry to find the operating input power level and set k. The gate driving signals, $gate_n$, and $gate_p$, are essentially the same signal when the converter is operating in critical conduction mode. However, both drive their respective MOSFETs off after $kT_{lf}$; thus $gate_n$, is a low voltage signal and $gate_p$ is a high voltage signal. $C_1$ and $C_2$ are input and output filter capacitors. Diode $Q_2$ may be used to precharge the energy storage element, thus enabling start-up from zero energy. The control circuitry for this boost converter generates the gate driving signals, given the zero crossing point of the inductor current and the parameters: $t_{on}$, $T_{lf}$, and k. This is for example achieved with the exemplary circuit 1800 shown in FIG. 18.

The voltage, $V_{zcrs}$, from the power stage is the positive input into a comparator with the negative input tied to ground. $V_{zcrs}$ is a negative voltage most of the time. Detection of a zero-crossing by the comparator triggers a pulse, from a one-shot circuit, with width $t_{on}$. This pulse is passed through two OR-gates and then to circuit 1500 as $gate_n$, and $gate_p$. A second input into the $gate_p$ OR-gate is a signal from a low frequency oscillator that is logic high after $kT_{lf}$. This ensures that both $Q_1$, and $Q_2$ are off after that point. The low frequency oscillator operating at period, $T_{lf}$, also provides the same signal to power off the comparator and one-shot circuitry when the converter is not in operation for reduced control power loss and to power them back on afterwards.

In an exemplary embodiment, if the boost converter operates continuously, the emulated resistance $R_{emulated}$ is only dependent on $t_{on}$ since k=1. This simplifies the control circuitry since only the zero crossing detecting comparator and the one-shot are used. However, these circuits are on continuously, even at low input power. In accordance with an exemplary embodiment, implementation of the low frequency duty cycle control method allows some of the circuitry to be powered off at times, depending on the input power level. Note that in an exemplary embodiment, peak power tracking components in the power controller sample the open circuit voltage, $V_{oc}$, of the input source when the converter is not in operation. These components may also sample the short circuit current, $I_{sc}$. These values maybe used to adjust k or $t_{on}$ and thus change $R_{emulated}$ to be the optimum impedance load. If operation at lower power levels is desired, these additional control blocks may be implemented.

Prior art power converters for very low power levels have low efficiency due to parasitic leakage currents and parasitic capacitance to the substrate. These limitations are removed by developing a set of integrated converters for high efficiency energy collecting/harvesting using an RF process. In an exemplary embodiment, this process is based on fully-depleted silicon-on-insulator (FD-SOI) with a thick upper metal layer for inductors and a high resistivity substrate. The primary advantages in this process for power processing are reduced parasitic capacitances, which are up to 1000 times lower than in a traditional CMOS silicon process. Such low parasitics facilitate high efficiency operation, even at very low power levels and frequencies as high as hundreds of kHz (allowing small component sizes). In accordance with an exemplary embodiment, an integrated power converter IC may be constructed with single and two-stage switched capacitor (SC) circuits, which have high efficiency at very low power levels since parasitic capacitance is small.

Figure 20:
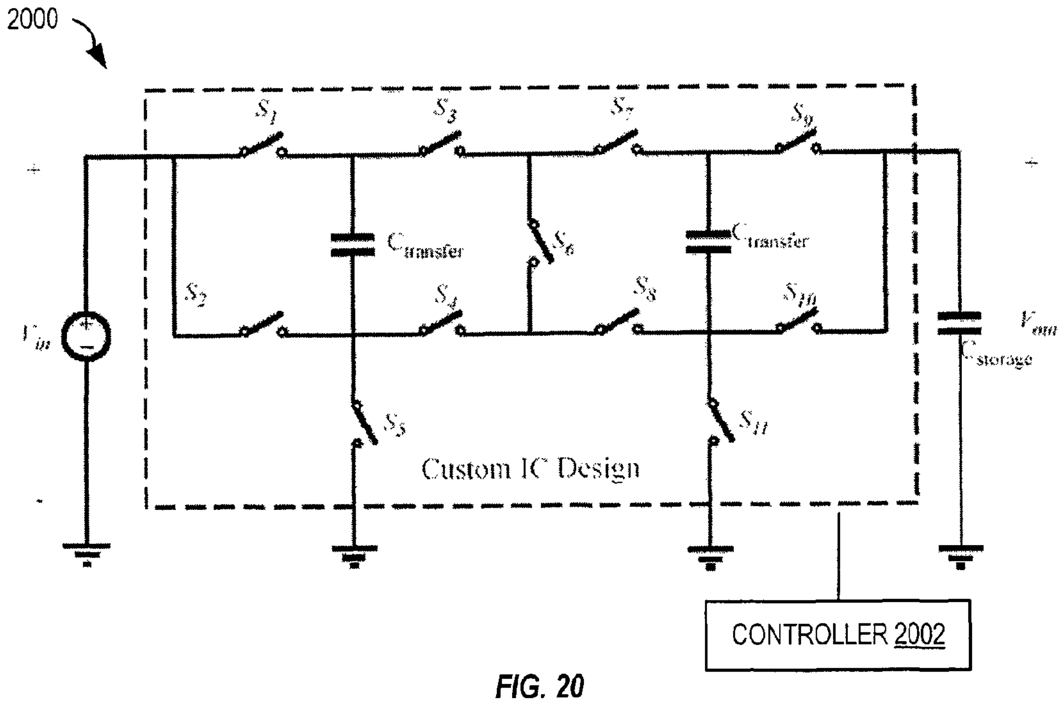
FIG. 20 shows one exemplary two-stage adaptable switching-capacitor topology of one embodiment.

FIG. 20 shows one exemplary two-stage SC topology 2000. On-chip buffers may be provided for each of the switches ($S_1$-$S_{11}$) and external control logic (e.g., controller 2002) may be used to determine the switching configuration. Topology 2000 generates eight distinct power conversion ratios from the input voltage ($V_{in}$) to the output voltage ($V_{out}$) for ratios from one third to three. The external control chip adaptively adjusts the switching frequency and topology to continuously extract maximum power from attached rectennas while storing the collected/harvested energy to the output capacitor ($C_{storage}$). As the output capacitor voltage builds, the converter sequences through topologies to maintain optimal loading of the rectenna and high efficiency.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A system for collecting radio frequency (RF) power, comprising:

a power source comprising at least a first antenna element and a second antenna element, wherein each of said first and second antenna elements are coupled to at least one rectifier to form at least two rectenna elements, said power source converting the RF power into a direct current (DC) power source output power;

a DC combining circuit associated with said power source, wherein said DC combining circuit is configured to dynamically combine said at least two rectenna elements in one of a plurality of series/parallel configurations;

a controlled impedance power controller comprising:

a power converter having a power converter input and configured to receive said DC power source output power at said power converter input, wherein said DC power source output power comprises current and voltage characteristics which may drift over time, wherein said power converter is configured to present a positive equivalent resistive load to said power source over a range of input power levels; and wherein said controlled impedance power controller is further configured to control said DC combining circuit such that said DC power source output power approaches a desired overall power output from said at least two rectenna elements; and an energy storage device configured to store said DC power source output power.

2. The system of claim 1, wherein the RF power is one of: microwave power, millimeter-wave power, radar power, and wireless signals produced for purposes other than powering the system.

3. The system of claim 1, wherein said power source comprises at least one of: (a) dual orthogonal linear polarization elements, wherein each orthogonal linear polarization element has at least one rectifier; and (b) dual orthogonal circular polarization elements, wherein each orthogonal circular polarization element has at least one rectifier.

4. The system of claim 1, wherein said power source device comprises a plurality of elements, wherein the plurality of elements is configured as a periodic or aperiodic array.

5. The system of claim 1, further comprising an electronic device powered from said storage device, wherein said external electronic device is selected from the group of: a medical device for implant into a brain, a medical device for implant into a spinal cord, a medical device for sensing electrocardiogram signals, a medical device for sensing electroencephalogram signals, a medical device for sensing electromyogram signals, a medical device for implant into a cochlea, a medical device for sensing blood sugar levels, a medical device for nerve and cellular stimulation, an environmental hazard sensor, industrial and commercial sensors and devices for building and structure control and automation, critical area sensors, assistive technology devices, aircraft devices, marine devices, satellite devices, retail environment devices, fire sensors and devices, security sensors and devices, and a power source sealed within an environment.

6. The system of claim 1, wherein at least one of: (1) said positive equivalent resistive load is tuned to approximately match the low frequency output impedance of the at least one power source; and (2) said positive equivalent resistive load is tuned to approximately maximize the output power of the at least one power source.

7. A system for converting direct current (DC) power received from at least one power source, the system comprising:

- a controlled impedance power controller, said controlled impedance power controller comprising:
  - a power converter having a power converter input and configured to receive DC power at said power converter input, wherein said DC power comprises current and voltage characteristics which may drift over time, wherein said power converter is configured to present a positive equivalent resistive load to the at least one power source over a range of input power levels; and
  - a storage device for storing converted power from the at least one power source.

8. The system of claim 7, wherein at least one of: (1) said positive equivalent resistive load is tuned to approximately match the low frequency output impedance of the at least one power source; and (2) said positive equivalent resistive load is tuned to approximately maximize the output power of the at least one power source.

9. The system of claim 8, wherein said controlled impedance power controller further comprises an energy management device for controlling at least one of a duty cycle k, an "on time" $t_{on}$, a low frequency period $T_{lf}$, and a high frequency period $T_{hf}$ of the power converter; and wherein the controller adaptively adjusts at least one of the duty cycle k, the "on time" $t_{on}$, the low frequency period $T_{lf}$, and the high frequency period $T_{hf}$ to tune collection of power from the at least one power source while storing the collected energy.

10. The system of claim 8, wherein said system is further configured to sense at least one of the following parameters: an open circuit voltage, a short circuit current, an operating voltage and current of the at least one power source, and the output current and voltage of said power converter; wherein said controlled impedance power controller is further configured to monitor the sensed parameters, and to present said positive equivalent resistive load to the at least one power source based on those monitored sensed parameters.

11. The system of claim 7, wherein said storage device is one of:

- a capacitor and said controlled impedance power controller charges said capacitor with variable output voltage at the output of said power converter based upon accumulated power within the capacitor; and
- a battery and said controlled impedance power controller charges said battery at the output of said power converter.

12. The system of claim 7, wherein the controlled impedance power controller comprises a first type of DC-to-DC converter selected from the group of: a four-switch buck-boost converter, a two-switch buck-boost converter, a boost converter, a buck converter, and a switched capacitor converter.

13. The system of claim 7, wherein said controlled impedance power controller comprises one of (a) an isolated step up, down, or up/down converter and (b) a non-isolated step up, down or up/down converter, wherein said step up, down or up/down converter comprises at least one of the following power converters: buck, boost, buck-boost, Flyback, SEPIC, and Cuk.

14. The system of claim 13, wherein said controlled impedance power controller operates in one of (1) an open loop in one of (x) discontinuous conduction mode and (y) critical conduction mode, and (2) a closed loop in continuous conduction mode; and

- wherein said controlled impedance power controller selects a DC-to-DC converter module and operating mode to achieve a desired input impedance for proper loading of said at least one power source.

15. A method of storing low power direct current (DC) power received from at least one power source, comprising the steps of:

- sensing current and voltage characteristics of the low power DC power;
- selecting, based upon the sensed characteristics, a DC-to-DC converter module and operating mode;
- selecting parameters, based upon the sensed characteristics, such that a positive equivalent resistive load is presented to the at least one power source at the input of said DC-to-DC converter module over a range of input power levels; and
- storing converted power, from said DC-to-DC converter module, in an energy storage device.

16. A device for collecting radio frequency (RF) power comprising:

- at least two rectenna elements, wherein said at least two rectenna elements comprises one of: (a) a first antenna integrated with a first rectifier and a second antenna integrated with a second rectifier, and (b) a first antenna integrated with a first rectifier and a second rectifier where each is configured for a different polarization;
- a power controller; and
- a direct current (DC) combining circuit associated with said at least two rectenna elements, wherein said DC combining circuit is configured to dynamically combine said at least two rectenna elements in one of a plurality of series/parallel configurations; and
- wherein said power controller is configured to control said DC combining circuit to achieve a desired overall power output from said at least two rectenna elements.

17. The device of claim 16, wherein said power controller determines which of said plurality of series/parallel configurations to use based on at least one of the power density, the frequency, and the polarization of the RF waves incident upon each of said at least two rectenna elements.

18. The device of claim 16, wherein said power controller determines which of said plurality of series/parallel configurations to use based on at least one of: output voltages, open circuit voltage, short circuit current, output current, and output power of said at least two rectenna elements, and power needs of a connected powered device.

19. The device of claim 16, wherein said at least two rectenna elements comprise:

a periodic or aperiodic and a uniformly or non-uniformly spaced array of rectenna elements, wherein said periodic or aperiodic and uniform or non-uniform array of rectenna elements is configured to receive at least one of: multiple polarizations, and multiple frequencies; and an enclosure for containing said periodic or aperiodic and uniform or non-uniform array of rectenna elements and electrical conductors to allow use in biomedical implants.

20. The device of claim 16, wherein said power controller and said DC combining circuit are configured to dynamically reconfigure the connectivity of said at least two rectenna elements to improve energy collecting efficiency for the device.

21. The device of claim 16, wherein each rectenna element of said at least two rectenna elements comprise an antenna element, and wherein at least one rectifier is integrated with each said antenna element.

22. The device of claim 21, wherein two rectifiers are coupled to each antenna and wherein the said two rectifiers are configured to at least one of: (1) rectify different polarizations of the RF power, and (2) create a higher voltage output from said at least two rectenna elements.

23. The device of claim 21, wherein each of said at least one rectifier is a two-terminal or three-terminal solid state device.

24. The device of claim 16, wherein feed points of each of the antenna elements are selected based upon at least one of: a desired polarization for each of the antenna elements, and a desired impedance of each of the antenna elements, the impedance selected to match rectifier impedance; and wherein at least one rectifier is positioned at each feed point.

25. The system of claim 16, further comprising sensing electronics for sensing characteristics of the DC power, wherein the sensing electronics sense at least one of the following:

at least one of short-circuit current and open-circuit voltage of one or more of the at least two rectenna elements;

at least one of current and voltage of one or more of the at least two rectenna elements; and the current and voltage of the DC power being provided to an energy storage device.

26. A method of collecting radio frequency (RF) power using a device comprising at least two rectenna elements, a power controller and a DC combining circuit, the method comprising the steps of:

receiving RF waves at each of said at least two rectenna elements;

determining which one of a plurality of series/parallel electrical configurations of said at least two rectenna elements will result in a desired overall power output from said at least two rectenna elements;

controlling at least one switch in the DC combining circuit to cause it to dynamically reconfigure the connectivity of said at least two rectenna elements in one of a plurality of series/parallel configurations;

storing the overall power output from said at least two rectenna elements in a storage device.

* * * * *